(12) United States Patent
Rappaport et al.

(10) Patent No.: US 8,200,212 B2
(45) Date of Patent: Jun. 12, 2012

(54) WIRELESS NETWORK SYSTEM AND METHOD

(75) Inventors: Theodore S. Rappaport, Austin, TX (US); Robert W. Heath, Austin, TX (US)

(73) Assignee: Intellectual Ventures Fund 43 LLC, Las Vegas, NV (US)

( * ) Notice: Subject to any disclaimer, the term of this patent is extended or adjusted under 35 U.S.C. 154(b) by 850 days.

(21) Appl. No.: 11/932,123

(22) Filed: Oct. 31, 2007

(65) Prior Publication Data

US 2009/0046638 A1    Feb. 19, 2009

Related U.S. Application Data

(63) Continuation of application No. 10/956,499, filed on Oct. 1, 2004, now Pat. No. 7,328,033.

(60) Provisional application No. 60/508,193, filed on Oct. 2, 2003, provisional application No. 60/513,273, filed on Oct. 1, 2003.

(51) Int. Cl.
*H04W 4/00*         (2009.01)
*H04Q 7/20*         (2006.01)

(52) U.S. Cl. .................. 455/426.2; 455/554.2; 455/434; 455/561

(58) Field of Classification Search .................. 455/560, 455/561, 515, 554.2, 422.1, 446, 425, 434, 455/562.1, 507, 426.2, 500; 370/401
See application file for complete search history.

(56) References Cited

U.S. PATENT DOCUMENTS

| 5,729,549 A | 3/1998 | Kostreski et al. ............. 370/535 |
| 6,628,768 B1 | 9/2003 | Ramaswamy et al. ... 379/202.01 |
| 6,763,025 B2 | 7/2004 | Leatherbury et al. ..... 370/395.64 |
| 6,870,515 B2 * | 3/2005 | Kitchener et al. ............ 343/853 |
| 7,069,060 B2 | 6/2006 | Kimata et al. ................ 455/574 |
| 2001/0034227 A1 | 10/2001 | Subramanian et al. ........ 455/419 |
| 2003/0154488 A1 | 8/2003 | Strater et al. ..................... 725/95 |
| 2004/0090971 A1 * | 5/2004 | Anderson, IV ............... 370/401 |
| 2005/0047529 A1 * | 3/2005 | Luo .............................. 375/341 |

* cited by examiner

*Primary Examiner* — John J Lee
(74) *Attorney, Agent, or Firm* — Connolly Bove Lodge & Hutz LLP

(57) ABSTRACT

Embodiments of the present invention provide a flexible system for providing wireless broadband access. The system can include a gateway that has a plurality of gateway premises equipment ("GPE") units and a network fuser connected to the plurality of GPE units to coordinate the activities of the plurality of the GPE units. The network fuser can provide DSP configuration information and RF configuration information to the GPE units. The network fuser is also operable to connect to a high-speed network (e.g., a backhaul network) and to provision data from the high-speed network to each of the plurality of GPE units. The system can also include a plurality of customer premises equipment ("CPE") units remote from the gateway.

116 Claims, 8 Drawing Sheets

WIRELESS NETWORK SYSTEM AND METHOD

RELATED APPLICATIONS

This application is continuation of application with Ser. No. 10/956,499, filed on Oct. 1, 2004 now U.S. Pat. No. 7,328,033. The application claims priority under 35 U.S.C. .sctn.119(e) to U.S. Provisional Application No. 60/508,193 entitled "A Flexible MIMO-Based Last Mile Wireless Network System and Method" by Heath et al., filed Oct. 2, 2003 and U.S. Provisional Patent Application No. 60/513,273, filed Oct. 1, 2003, entitled "A Flexible MIMO-Based Last Mile Wireless Network System and Method" by Heath et al., both of which are hereby fully incorporated by reference herein.

BACKGROUND

Wireless communication networks have enjoyed rapid growth in recent years, as evidenced by the rapid deployment of IEEE 802.11a/b/g networks and the adoption of 2.5 G and 3 G cellular telephone networks. These wireless networks are now used throughout the world. 802.11a/b/g networks provide an advantage of working in a band of the radio spectrum currently unlicensed in the United States, as described in Rappaport, Wireless Communications, Prentice Hall c. 2002. The use of the unlicensed spectrum allows users including individuals and businesses to simply purchase equipment and set up wireless devices without requiring licenses.

Another recent breakthrough, that of MIMO or space time coding, exploits slight spatial/temporal variations in the wireless communication channel (e.g. the propagation environment). By using multiple, closely spaced antennas, it becomes possible to harness the energy impinging on each antenna, at either a transmitter or receiver, in order to establish a much improved wireless communication link as compared to single-antenna or diversity antenna schemes. MIMO and space time coding has been explored and described in the following prior art references:

R. W. Heath, Jr. and A. J. Paulraj, "Multiple antenna arrays for transmitter diversity and space-time coding," Proc. of the IEEE Int. Conf. on Communications 1999, pp. 36-40, vol. I, Vancouver, Canada, Jun. 6-10, 1999. This paper describes the idea of using multiple smart antennas for space-time coding and discusses the effect of imperfect beamforming; but does not consider explicitly multiple users.

Space-time coding for the parametric fading channel Sandhu, S.; Paulraj, A.; Signals, Systems & Computers, 1998. Conference Record of the Thirty-Second Asilomar Conference on, Volume: 1, Nov. 1-4, 1998 Page(s); 774-779 vol. 1. This paper describes an idea of coding across beams. This paper is different than the paper by Heath and Paulraj since multiple beams in a single adaptive array is used instead of coding across multiple arrays.

Combined array processing and space-time coding Tarokh, V.; Naguib, A.; Seshadri, N.; Calderbank, A. R.; Information Theory, IEEE Transactions on Volume: 45 Issue: 4, May 1999 Page(s): 1121-1128. This paper shows how to get the benefits of both diversity and rate gain by using space-time codes on groups of antennas.

Capacity of multiple-transmit multiple-receive antenna architectures: Lozano, A.; Tulino, A. M. Information Theory, IEEE Transactions on page(s): 3117-3128 Volume: 48, Issue: 12, December 2002. This paper offers some capacity results with different antennas architectures and includes some interference performance results as well.

Turbo-BLAST for wireless communications: theory and experiments: Sellathurai, M.; Haykin, S.; Signal Processing, IEEE Transactions on, Volume: 50 Issue: 10, October 2002 Page(s): 2538-2546. This paper describes BLAST in conjunction with turbo codes and teaches the potential of MIMO when combined with concatenated codes.

Link-optimal BLAST processing with multiple-access interference: Farrokhi, F. R.; Foschini, G. J.; Lozano, A.; Valenzuela, R. A.; Vehicular Technology Conference, 2000. IEEE VTS-Fall VTC 2000. 52nd, Volume: 1, 2000, Page(s): 87-91 vol. 1. This paper describes some MIMO algorithms that account for interference using well known or standard signal processing type ideas.

U.S. Pat. No. 5,345,599, entitled "Increasing capacity in wireless broadcast systems using distributed transmission/directional reception (DTDR)", A. Paulraj and T. Kailath, Issued: September 1994. This patent is one of the first to propose the idea of spatial multiplexing in MIMO communication systems; the concept is proposed in the context of high-definition television transmission.

U.S. Pat. No. 6,067,290 "Spatial Multiplexing in a Cellular Network." A. J. Paulraj, R. W. Heath, Jr., S. K. Peroor, and D. Gesbert. Filed: Jul. 30, 1999. Issued: May 23, 2000. Assignee: Iospan Wireless Inc. (formerly Gigabit Wireless Inc.). This patent discusses the idea of spatial multiplexing in cellular network; it describes functionality such as partial handoff and substream control that will be necessary in cellular networks that employ MIMO communication systems.

U.S. Pat. No. 6,298,092 "Methods of Controlling Communication Parameters of Wireless Systems," R. W. Heath, Jr., S. K. Peroor, and A. J. Paulraj. Filed: Jun. 2, 2000. Issued: Oct. 2, 2001. Assignee: Iospan Wireless Inc. This patent describes methods for adaptive space-time modulation. In particular, the patent describes the idea of switching between a diversity space-time code and a multiplexing space-time code.

U.S. Pat. No. 6,377,632 "Wireless communication system and method using stochastic space-time/frequency division multiplexing," A. J. Paulraj, S. K. Peroor, J. Tellado, R. W. Heath, Jr., S. Talwar, and H. Bolcskei. Filed: Jan. 24, 2000. Issued: Apr. 23, 2002. This patent is an extension of OFDM that involves space/time/frequency domain representations.

U.S. Pat. No. 6,377,636 "Method and wireless communications system using coordinated transmission and training for interference mitigation," A. J. Paulraj, S. K. Peroor, J. Tellado, and R. W. Heath, Jr. Filed: Nov. 2, 1999. Issued: Apr. 23, 2002. This patent describes an idea to coordinate the transmissions in a cellular network to improve the performance of interference cancellation algorithms. Each of the foregoing prior art references is hereby fully incorporated by reference herein.

Current systems employ wireless gateway equipment and wireless user equipment. The wireless user equipment receives signals from and sends signals to the wireless gateway equipment. The wireless gateway equipment provides access to another network, such as the internet. Current systems for providing high-speed data access via wireless communication links include directional and cellular systems. Directional systems rely on highly directional antennas at the wireless gateway equipment and the wireless user equipment that must be pointed line-of-sight at each other for proper operation. These systems can typically only serve one or a limited number of users. Cellular systems, on the other hand, use a network of base stations to provide wireless coverage to a larger number of users. However, cellular systems require a significant infrastructure investment.

SUMMARY OF THE INVENTION

Embodiments of the present invention provide a system and method for wireless communication that eliminates, or at least substantially reduces, the shortcomings of prior art systems and methods for "last-mile" wireless communication. More particularly, embodiments of the present invention provide a flexible system for providing wireless broadband access. The system can include a gateway that has a plurality of gateway premises equipment ("GPE") units and a network fuser connected to the plurality of GPE units to coordinate the activities of the plurality of the GPE units. The network fuser can provide DSP configuration information and RF configuration information to the GPE units. The network fuser is also operable to connect to a high-speed network (e.g., a backhaul network) and to provision data from the high-speed network to each of the plurality of GPE units. The system can also include a plurality of customer premises equipment ("CPE") units remote from the gateway. Each GPE unit can establish a wireless communications link, such as a MIMO link, with at least one CPE unit to wirelessly transfer data. According to one embodiment of the present invention, the GPE units and CPE units can have the same architecture to reduce cost.

The network fuser can be located in a GPE unit (or CPE unit) or can be connected to the GPE units (or CPE units) via a SCSI bus, network or other data transport medium for transferring configuration information and data. The network fuser can provide a variety of functions such as provisioning bandwidth, providing access controls and performing other functions. For example, the network fuser can determine if new GPE units have been added to the gateway and can re-provision bandwidth accordingly.

The network fuser can provision bandwidth based on a number of parameters, including, but not limited to the forward link state or reverse link state of particular wireless communication links, the state of the backhaul network, user information (e.g., an access history, a user priority, an account balance grade-of-service, quality-of-service requirements) and/or channel statistics (e.g., average capacity, path loss and fading rate, mean, a variance, a delay spread, a power-delay profile, Doppler, a special covariance, a correlation, or a space-time correlation or other channel statistic). User specific information can be stored, for example, in a logical table indexed by user name, network address, MAC address, flow number or other identification.

In order to collect channel statistics, for example, the network fuser can instruct one or GPE units and/or CPE units to probe channels using training sequences, pilot tones or other channel probing mechanisms known in the art. The channel probes can occur on-line or off-line. The GPE units and CPE units can return channel measurements to the network fuser. The network fuser can derive instantaneous channel statistics based on the channel probes and adjust bandwidth provisioning according to any provisioning algorithm known in the art. Additionally, the network fuser can instruct the GPE and CPE units to perform channel probes to determine interference caused by simultaneous transmissions. The network fuser can use the channel statistics to provision bandwidth or to adjust the antennas and/or beam patterns of the GPE units and/or CPE units.

According to one embodiment of the present invention, bandwidth provisioning can occur based on the amount of data queued for a particular CPE. The network fuser can be operable to determine the CPE unit from the plurality of CPE units that has a largest queue of data to be sent, determine a maximum data rate that can be used to send data to the CPE unit with the largest queue and if a total capacity exceeds the maximum data rate, provisioning bandwidth to send data to the CPE unit with the largest queue and using excess capacity to service other CPE units.

In addition to provisioning bandwidth, the network fuser can adjust adaptive antennas at the GPE units and/or CPE units based on user information, channel statistics, grade-of-service requirements, service provider requirements, quality-of-service requirements or other parameters. The antennas can be adjusted to affect the beam forming provided by a GPE and/or CPE units. Additionally, the network fuser can allocate physical resources to the connected GPE and or CPE units.

The GPE and CPE units can have the same architecture so that the same physical box can be deployed at either the gateway, as part of the base station, or the customer premises. According to one embodiment of the present invention, the GPE or CPE unit can have a flexible architecture that allows additional RF circuitry, which can be included on a RAD card to be easily added to the GPE or CPE. The GPE or CPE can include an RF backplane with antenna connections to connect to antennas and RF connections to connect to radio circuitry (i.e., RF circuitry). The RF backplane can be configurable to connect the antenna connections to the RF connections in a variety of configurations. The GPE or CPE can be configured such that additional sets of RF circuitry can be added through, for example, the addition of new RAD unit. The RF backplane can be reconfigured to accommodate the new RF circuitry. The GPE or CPE unit can include a network fuser that can determine when a new RAD unit has been added to reconfigure the RF backplane and, for example, re-provision bandwidth or physical resources.

Another embodiment of the present invention can include a system for wireless communication that can include a network fuser connected to a first customer or gateway premises equipment (GPE/CPE) unit (e.g., customer premises or gateway premises equipment) via a control data transport medium (e.g., SCSI bus, Ethernet, wireless link, fibre channel, optical link, ATM network or other data transport medium known in the art). The network fuser through, for example, execution of computer instructions, can be operable to provide radio frequency ("RF") configuration information and digital signal processing ("DSP") configuration information to a first GPE/CPE unit. The DSP configuration information can include an indication of the space-time algorithm that the first GPE/CPE unit should use, coding to be applied by the first GPE/CPE unit, modulation to be applied by the first GPE/CPE unit and other configuration information that affects how the GPE/CPE unit processes data to be transmitted via a wireless communication link or received via the wireless communication link. The RF configuration information can include RF parameters such as gain, phase, attenuation, oscillator, or RF frequency that can be applied. Other RF configuration information can include the subset of antennas from which to receive signals if signal combining is to be performed, the weights of the antenna combining including phased or more sophisticated weighting methods, whether to power on or power off the RF circuitry or other configuration information that can affect an RF circuitry.

According to one embodiment of the present invention, the first GPE/CPE unit can include a plurality of antennas, and a plurality of sets of RF circuitry. The GPE/CPE unit can include an RF backplane that includes RF backplane circuitry that is operable to connect the RF circuitry to the antennas in a variety of configurations. The RF backplane can have an arbitrary number of connections for antennas and RF circuitry so that additional RF circuitry and antennas can be connected to the RF backplane. The RE backplane can be connected to the control data transport medium and can receive control signals from the network fuser. The network fuser can be operable to configure the RF backplane to connect various antennas to RF circuitry according to a configuration determined by the network fuser. In another embodiment of the present invention, the network fuser can be integrated into the GPE/CPE unit.

The first GPE/CPE unit can also include one or more adaptive antennas. The network fuser can configure the GPE/CPE unit to adjust the adaptive antennas by, for example, providing RF configuration information to the GPE/CPE unit or adjusting an RF backplane. The network fuser can also provide DSP configuration information (e.g., space-time processing information, modulation information, coding information) and/or RF configuration information to adjust the beam patterns generate by the GPE/CPE unit.

The present invention can also include a second GPE/CPE unit remote from the first GPE/CPE unit. The first GPE/CPE unit can be operable to establish a wireless communication link with the second GPE/CPE unit, such as a multi-input/multi-output ("MIMO") communication link. The network fuser can be operable to configure the first GPE/CPE unit to establish the wireless communication by, for example, providing appropriate DSP configuration information (e.g., space-time algorithm, modulation and coding) and RF configuration information. Configuration of the first GPE/CPE unit can be based, for example, on instantaneous channel data (e.g., the mean, variance, delay spread, power-delay profile, Doppler, spatial covariance, correlation, and space-time correlation and other instantaneous channel data) received from the first GPE/CPE unit or the second GPE/CPE unit. In order to gather various pieces of information about a particular channel, the network fuser can instruct the first GPE/CPE unit or second GPE/CPE unit to probe a channel.

The network fuser, according to one embodiment of the present invention can provision bandwidth to the communication link established between GPE/CPE units. This can be done, for example, by providing the GPE/CPE unit with appropriate DSP and RF configuration information for the desired bandwidth. Additionally, the network fuser can provide access controls based, for example, on authentication before allowing data to be transferred to or communicated from a data network via the wireless link between GPE/CPE units.

Additional GPE/CPE units can be connected to the network fuser via the control data transport medium. In this case, the network fuser can be operable to configure the multiple GPE/CPE units. The network fuser can receive data from a data network and provision the data to the multiple GPE/CPE units for communication to one or more remote GPE/CPE units via a wireless communication link. The network fuser can ensure that the PEs to which it can communicate configuration information work together to provide communications links that do not interfere or have minimal interference.

Embodiments of the present invention can include an RF backplane that includes a plurality of antenna connections, connection circuitry and a plurality of RF connections connected to the antennas connections via the connection connections. The RF backplane can include control logic that is operable to configure the RF backplane to connect the RF connections to the antenna connections via the connection circuitry in a variety of configurations. The control logic can be responsive to control signals received from, for example, a network fuser to change the configuration of the backplane. The RF backplane also include connection sensing circuitry to determine when RF circuitry, such as an RF circuitry of a RAD, has been connected to the RF connection.

Another embodiment of the present invention can include a device that provides RF and digital signal processing capabilities. The device can be modular and be connected to other similar devices. The device can comprise an RF backplane interface to connect to an RF backplane, a DSP unit and RF circuitry. The DSP unit can be operable to generate a transmit digital signal. The RF circuitry can be operable to generate an output signal based on the transmit signal; and generate the receive signal based on an input signal.

The DSP unit can generate the transmit signal based on space-time processing, modulation and coding implemented by the DSP unit. The DSP unit can be reconfigured based on DSP configuration information to generate the transmit signal using various space-time processing algorithms, modulations and/or encodings. Additionally, the parameters of the RF circuitry can be reconfigured. Thus, the device can support various space-time processing configurations.

The device can include a digital interface to connect to a control data transport medium. The DSP can receive DSP configuration information from control logic via the digital interface. The DSP control logic can be located at, for example, a network fuser, a RAD unit or other device. The device of one embodiment of the present invention can be operable to function in a master or slave configuration.

According to one embodiment of the present invention, the device can be a RAD unit that is modular in design. The RAD can have a form factor such that it can be connected to and removed from a GPE/CPE unit relatively easily. Therefore, RAD units can be added to or removed from a GPE/CPE unit easily to provide additional functionality.

Another embodiment of the present invention can include a system for wireless communication comprising a first RAD unit, a second RAD unit, a plurality of antennas, an RF backplane connecting the plurality of antennas to the first RAD unit and the second RAD unit. The system can also include a network fuser connected to the first RAD unit and the second RAD unit and the RF backplane via, for example, a control data transport medium. The network fuser can be operable to provide DSP configuration information to the first RAD unit and the second RAD unit, provide RF configuration information to the first RAD and the second RAD; and provide control signals to the RE backplane to configure the RF backplane to connect the plurality of antennas to the first RAD unit and the second RAD unit.

The network fuser can configure the RAD units to establish MIMO communications links according to various configurations. The communications links can be configured based, for example, on instantaneous channel data. To gather channel data, the network fuser can instruct the RAD units to probe one or more communications channels. The network fuser can reconfigure the RAD units in real time based, for example, on activity of the data network, the communications link or other information. Additionally, the network fuser can provision bandwidth to the communications established by the RAD units and can provide access control.

According to one embodiment of the present invention, the network fuser can determine that a new RAD unit has been added. This can be done, for example, based on information received from the RF backplane circuitry or from the new RAD unit. The network fuser via the control data transport medium can determine the functionality of the new RAD unit (e.g., how many antennas the RAD unit has, the number of sets of RF circuitry, space-time algorithms supported or other information that can be used in configuration of the RAD unit). This information can be provided by, for example, the DSP unit of the new RAD unit. Based on information received from the new RAD unit, the network fuser can reconfigure the existing RAD units and configure the new RAD unit.

Embodiments of the present invention provide an advantage over prior art systems and method of wireless communication by providing a configurable antenna mesh to which additional antennas and RF circuitry can be added.

Embodiments of the present invention provide another advantage providing multiple, modular, units that can work together to support various space-time processing. The units can be controlled by a centralized controller (e.g., a network fuser). Because configuration of communications links can be centralized, additional units for supporting additional communications links can be easily added.

Embodiments of the present invention provide another advantage by providing a mechanism for controlling multiple units to ensure they work together to provide instantaneous bandwidth provisioning and coverage.

BRIEF DESCRIPTION OF THE FIGURES

A more complete understanding of the present invention and the advantages thereof may be acquired by referring to the following description, taken in conjunction with the accompanying drawings in which like reference numbers indicate like features and wherein.

DETAILED DESCRIPTION

Embodiments of the present invention provide a flexible architecture for provisioning of data via a wireless communications link.

Figure 1:
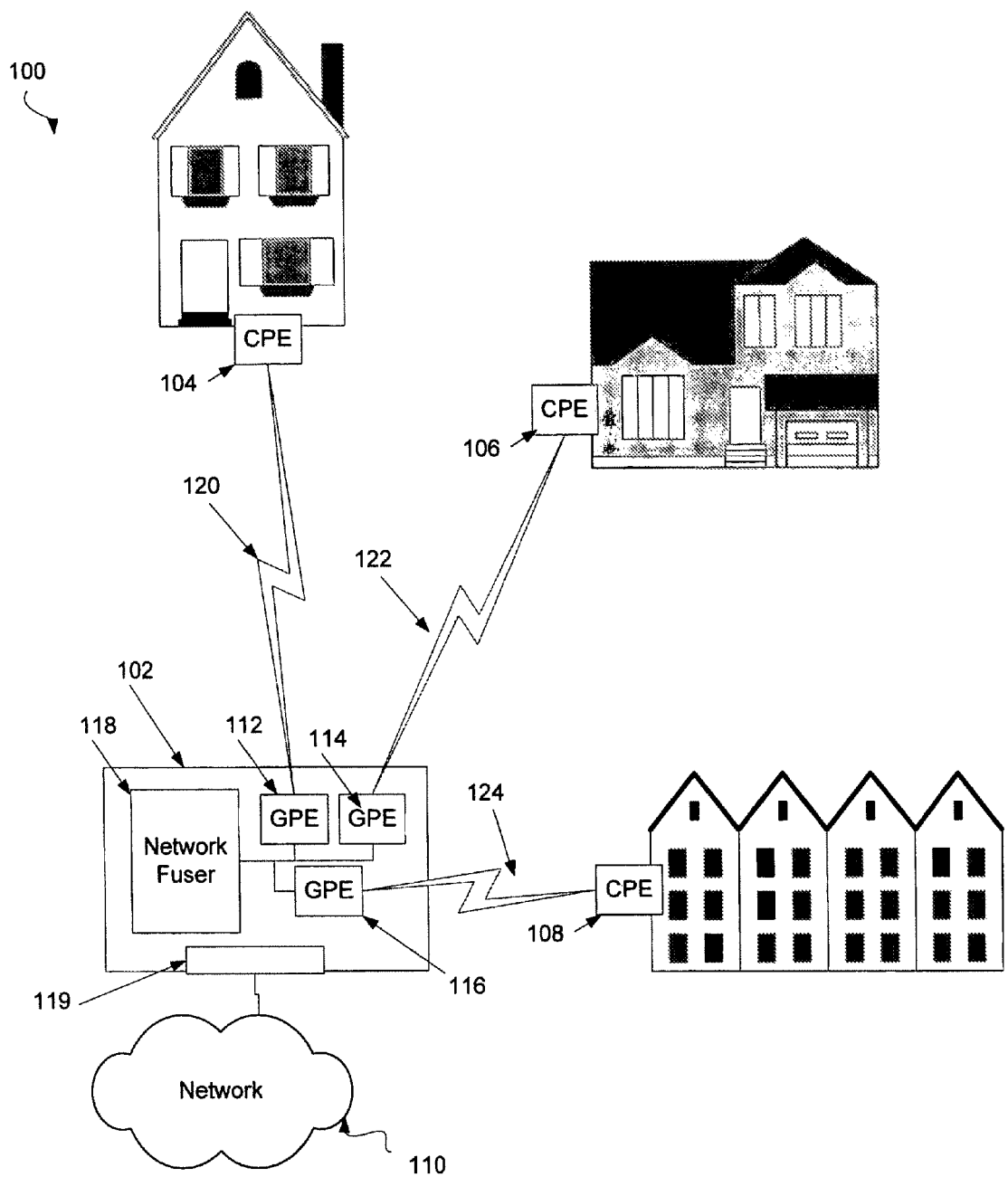
FIG. 1 is a diagrammatic representation of a wireless communication system according to one embodiment of the present invention.

FIG. 1 illustrates one embodiment of a communications network 100 for providing a wireless high-speed communications link. FIG. 1 depicts provisioning of wireless access to end-users (i.e., "last mile" provisioning). The system 100 comprises a gateway 102, several sets of customer premises equipment ("CPE") (CPE 104, CPE 106, CPE 108) and a data transport network 110 (e.g., Ethernet, the Internet, a wireless network or any data network known in the art). It should be noted that the term "customer premises equipment" is simply used to refer to equipment that can wirelessly communicate with gateway 102. According to one embodiment of the present invention, network 110 can be a high-speed network 110. Gateway 102 can include gateway premises equipment ("GPE") 112, 114 and 116, network fuser 118, and a connection 119 to data transport network 110. According to other embodiments of the present invention network fuser 118 can be part of a GPE.

Each location at which high speed network access is desired (residence, office building, or other location) can be equipped with a CPE. According to one embodiment of the present invention a CPE can be an integrated device that can contain any number of antennas and transceivers. Additionally, each CPE can include signal processing logic. According to other embodiments of the present invention, the functionality of a CPE can be distributed. An exemplarily architecture for a CPE is discussed below in conjunction with FIGS. 4-6.

Gateway 102 interfaces between data transport network 110 and the wireless link(s) (e.g., link 120, link 122 and link 124). In one embodiment Gateway 102 includes GPEs 112, 114 and 116, network fuser 118, and a connection(s) 116 to data transport network 110. Gateway 102 can act as an aggregation point for various connections (e.g., T1/T3/OC3/OC12 and others) to network 110.

Each CPE (e.g., CPE 104, CPE 106 and CPE 108) connects via a wireless communication link (represented by link 120, link 122 and link 124) to a GPE. Each GPE 112, 114 and 116 can be a complement to the respective CPE and can facilitate the communication link between gateway 102 and the corresponding CPE. A CPE can contain a number of antennas, transceivers, and advanced signal processing technology. Generally it can comprise of one or more RAD units, described in greater detail below. It may be installed outside, on the wall, or roof, or may be installed indoors. For outdoor installations it will generally be waterproof.

Each CPE can employ the flexible RF backplane, as well as RAD units for processing. In one embodiment, software is used that supports multi-mode multi-band communication. A software program can be used to activate certain subsets of antennas according to the frequency and bandwidth of the signal being transmitted or received. This configuration may be done once when the unit is installed or it may be performed in real-time over the course of the second/minute/hour/day. The software that performs this configuration may reside in the CPE or may reside in the other functional units to be described (such as the network fuser or another CPE).

It should be noted that any number of outputs from the CPE are possible including telephone, Ethernet (10/100/1 G/10 G bps), analog audio, digital audio, digital video, and internet traffic among others. In one embodiment, the GPE (described below) manages the functions of the CPE. Additionally, a billing and service center may adjust the functionality of the CPE according to the service plan as subscribed to by the user. Alternatively, the CPE may control its own functions or may be controlled via a local network or a network fuser connected to the CPE. For example CPE 112 can be controlled by a computer on a home network or can be controlled by a network fuser connected to CPE 112.

The GPE is the complement to the CPE. The GPE facilitates a MIMO communication link constructed between the gateway and the customer premises. In one embodiment, a GPE is installed at the gateway for each CPE that needs to be supported. For each additional CPE that is added, an additional GPE is installed at gateway 102 to support that CPE. Gateway 102 may automatically configure itself as a function of the number of GPEs installed or it may require manual configuration. A GPE can employ the same architecture as a CPE or may be different. Generally, each GPE (e.g., GPE 112, 114 and 116) can comprise a plurality of RAD units, like the CPE. These RAD units could be configured in the same manner as the RAD units of the CPE, but generally will have a different control structure that takes advantage of the additional information available via the network fuser 118. This reduces costs since only one type of unit needs to be manufactured. In another embodiment the architecture of the GPE can different than the CPE and can contain more functionality. In this case a GPE may be equipped with more antennas or less antennas than the CPE. Generally it can be designed according to similar requirements such as low cost, waterproof, extendable, cookie cutter design, etc.

In the embodiment of FIG. 1, a GPE can be installed for each CPE that needs to be supported. For each additional CPE that is added (e.g., for each additional customer) an additional GPE can be added. In an alternative embodiment, multiple CPEs may share same GPE. Once again, the GPE may be identical to a CPE or may differ from the CPE to provide additional functionality. An exemplary architecture for a GPE is discussed below in conjunction with FIGS. 4-6.

A communications link between a particular CPE and GPE, such as communications link 120 between GPE 112 and CPE 104, can be a multi-input/multi-output ("MIMO") communications link that relies on multiple antennas at the GPE, the CPE or both. One example of a MIMO communications system is discussed in conjunction with FIG. 2, below. In one embodiment, the MIMO communication link can exploit beam forming to adaptively adjust the beam patterns of the receive antennas. One example of MIMO communication link that can exploit beam forming is discussed below in conjunction with FIG. 3. In this embodiment, adaptive antennas, implemented using space-time beam forming, are employed instead of using fixed antennas. Essentially, in this case, a number of antennas are used to create an adaptive antenna that has an adjustable beam pattern. Embodiments of the present invention can employ any adaptive antenna and space-time beam forming mechanisms known in the art.

Multiple-access technique may be employed over the wireless link. Access techniques such as TDMA, CDMA, FDMA, OFDMA, MC-CDMA, SDMA, and combinations thereof may be employed to achieve this goal. In one embodiment, TDMA is combined with SDMA to allow the channel to be shared. In this case, users are separated by both their spatial signatures, through space-time processing, as well as by different time-slot assignments. Spatially separate users may be allowed to share a given time-slot through the use of SDMA while spatially adjacent users will be assigned different time-slots.

In operation, multiple MIMO links (e.g., communication link 120, communication link 122 and communications link 124), as illustrated in FIG. 1, are allowed to coexist. Network fuser 118 (through use of hardware, software and/or firmware) coordinates the transmissions of the various GPEs (e.g., GPE 112, GPE 114 and GPE 116). Network fuser 118 can make decisions about space/time/frequency allocation that may be static (e.g., done only on install or infrequently) or may be dynamic. In one embodiment, all resources are allocated dynamically. The spatial element can be used in the embodiment illustrated in FIG. 1. In this case, network fuser 118 controls the beam widths of the MIMO arrays to reduce co-channel interference. The weights for the space-time beam formers may be determined from channel measurements, channel reciprocity, or prediction for example.

The selection of the space-time beam form can also depend on the operation of the other MIMO links. For example, if a particular MIMO link is not operating at the moment, then the beam former does not need to reduce interference to this link (e.g., if link 124 is not operating, network fuser 118 does not have to consider link 124 when reducing interference to the other links).

Adaptive power control and adaptive modulation can be used to minimize interference and maximize data rate depending on the needs of the given user. CPEs that are located close to the access point might take advantage of higher data rates using space-time adaptive modulation while those further away might take advantage of the diversity to reduce fading and outages.

Thus, embodiments of the present invention can include a system for establishing a wireless communications link that includes a gateway having a network fuser and one or more GPE units. Each GPE can establish a wireless communication link with a corresponding CPE unit remote from the gateway. The network fuser can be operable to adaptively control the GPE units to configure the communications links. More particularly, the network fuser can adaptively configure the GPEs to configure MIMO communications links, perform network provisioning, flow control and control usage of an attached network (e.g., network 110). The MIMO communications links can be dynamical configured under control of the network fuser to provide high-data rate, extended range, power efficiency and interference control.

Figure 2:
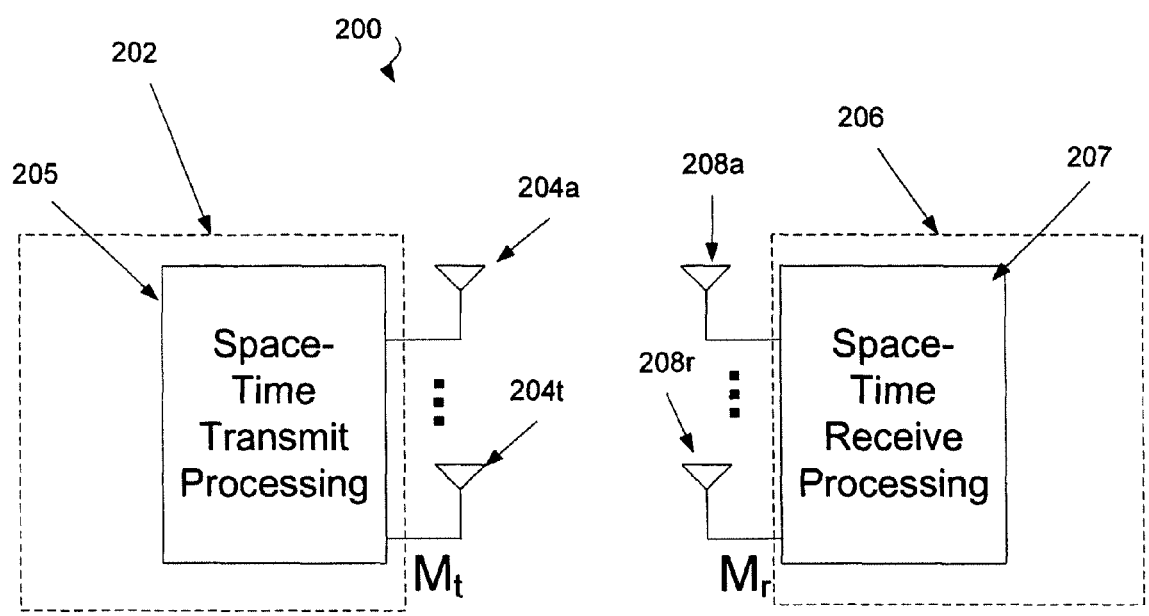
FIG. 2 is a diagrammatic representation of an embodiment of multi-input/multi-output communications system.

FIG. 2 is a diagrammatic representation of one embodiment of a MIMO communication system 200. Transmitter 202 is equipped with M.sub.t antennas 204.sub.a-t while receiver 206 is equipped with M.sub.r antennas 208.sub.a-r. Because there are essentially M.sub.t*M.sub.r paths between transmitter 202 and receiver 206, the likelihood that a channel will be dropped is decreased compared to a single path system. Space-time transmit processing module 205 is used to map a sequence of bits to space-time code words for transmission. Receiver 206 may have fewer or more antennas than the transmitter 202. In one embodiment, space-time processing module 207 is used at receiver 206 to decouple the transmitted signal streams and to detect the transmitted bit stream.

Figure 3A:
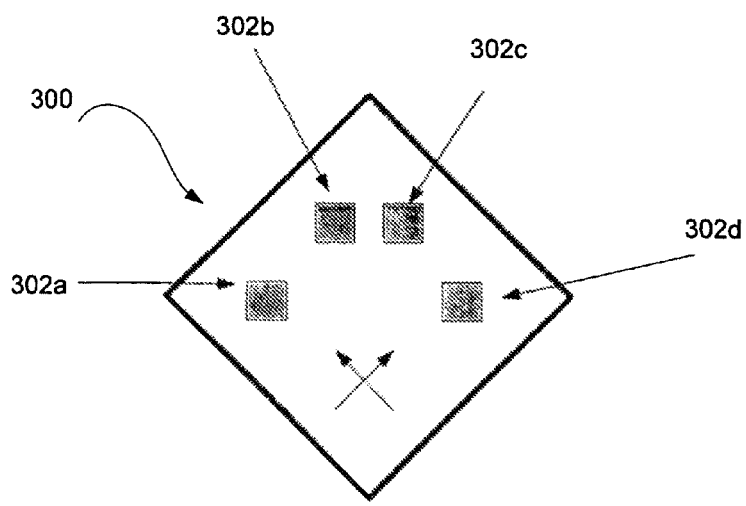
FIG. 3A is a diagrammatic representation of one embodiment of an adaptive antenna and FIG. 3B is a diagrammatic representation of an embodiment of a multi-input/multi-output communications system using adaptive antennas.

FIG. 3A is a diagrammatic representation of one embodiment of an adaptive array 300. Adaptive array 300 can include multiple antennae 302.sub.a-d. The difference between the system of FIG. 2 and array 300 of FIG. 3 is that array 300, rather than a single antennae, is used at the transmitter or receiver to establish the communications link. In other words, antennas 302.sub.a-d can act as a single adaptive antenna that has an adjustable beam pattern. The pattern can be adjusted based on any number of algorithms known to those skilled in the art to maximize received signal-to-noise ratio, signal-to-interference ratio, signal-to-interference-plus-noise ratio, or to minimize interference. The transmit beam may be derived using reciprocity relationships from the optimal receive beam pattern or may be inferred from control information. The patterns may be a function of the number of active users and may in part be determined by user traffic as well as the scheduling algorithms. Interference may include other transmissions from the same CPE or GPE or transmission from a different CPE or GPE. The patterns may be adjusted dynamically or may be configured once and then fixed.

Figure 3B:
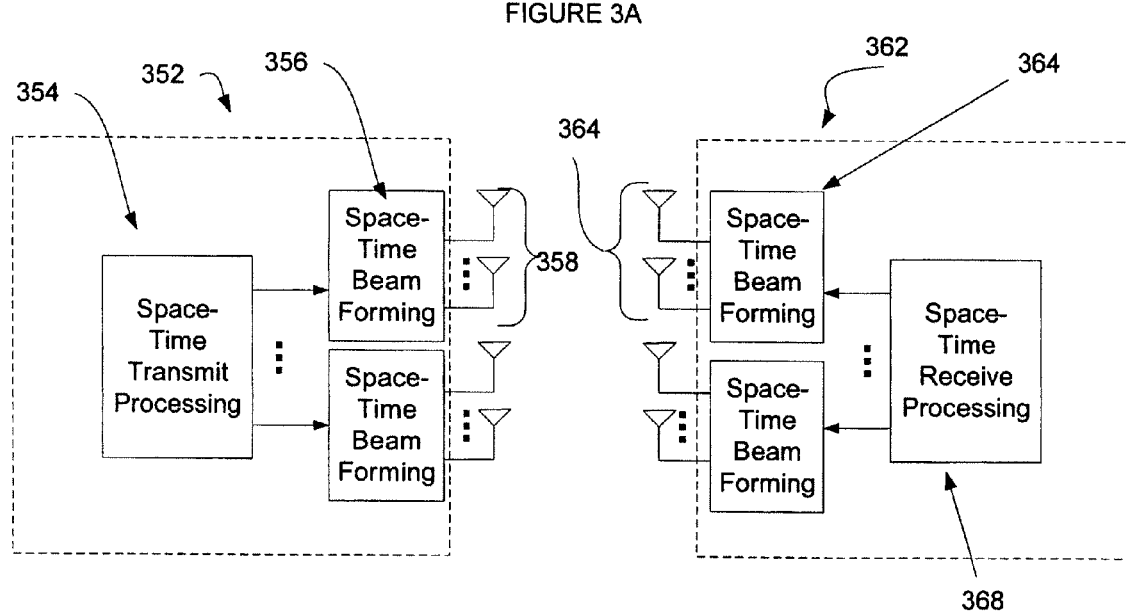

FIG. 3B is a diagrammatic representation of one embodiment of a system 350 that employs multiple antenna arrays, such as that shown in FIG. 3, for transmitting and receiving data. Transmitter 352 (e.g., a CPE or GPE) can include space-time transmit processing 354 to map a sequence of bits to space-time code words for transmission. Space-time beam forming 356 can then configure an adaptive antenna (e.g., antenna array 358), for spatially shaping the transmitted signal. At receiver 362 (e.g., a CPE or GPE), adaptive antenna 364 (e.g., antenna array 364), can receive the transmission beam. Space-time beam forming 366 can compensate for the beam pattern and space-time receive processing 368 can decouple the transmitted signal streams and detect the transmitted bit stream. It should be noted that either a fixed antenna system, as described in conjunction with FIG. 2, or adaptive antenna array system, as described in conjunction with FIGS. 3A and 3B, can be used by the CPEs and GPEs.

Figure 4A:
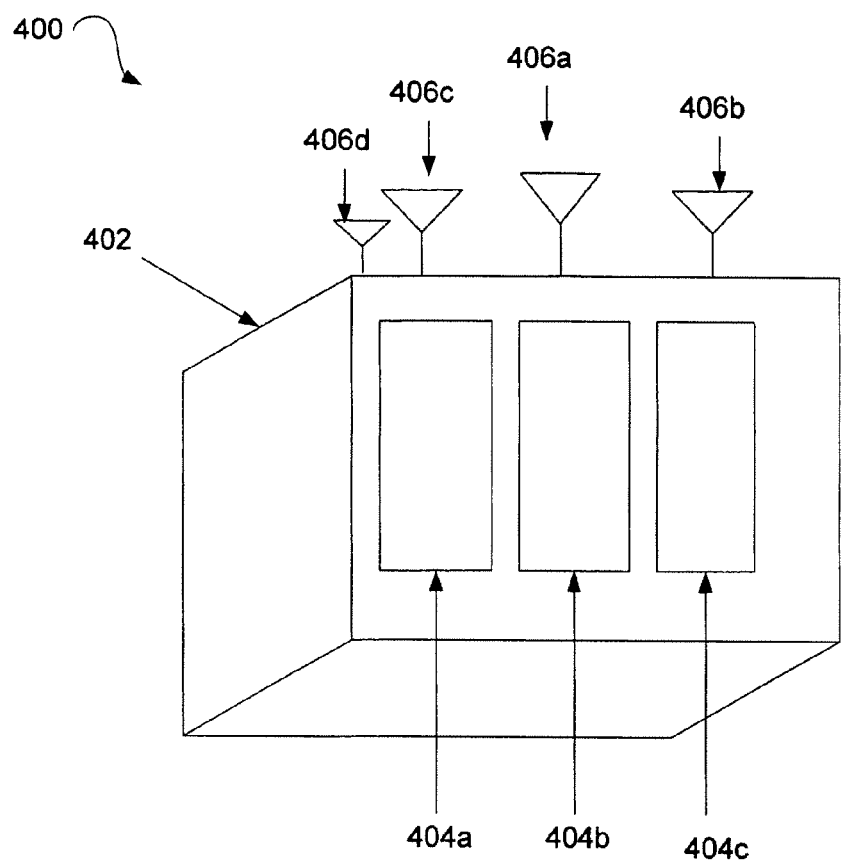
FIG. 4A is a diagrammatic representation one embodiment of a GPE/CPE unit and FIG. 4B is a diagrammatic representation of one embodiment of a radio frequency ("RF") backplane that can be employed by a GPE/CPE unit.

FIG. 4A is a diagrammatic representation of one embodiment of a device, including gateway or customer premises equipment unit ("GPE/CPE unit") 400, such as a GPE or CPE. It should be noted that since the CPE and GPE can have an identical or similar architecture, the embodiments of FIGS. 4-7 are equally applicable to both. However, it should also be noted that the CPE and GPE may differ. GPE/CPE unit 400 can include a housing 402. According to one embodiment of the present invention, the housing 402 can have a form factor of approximately the size of clock radio, cable modem, personal computer, home entertainment center or other arbitrary design. Housing 402 can include a number of expansion slots 404.sub.a-c to allow the addition of RAD units. Although only three slots are shown, GPE/CPE unit 400 can support an arbitrary number of RAD units. GPE/CPE unit 400 can include any number of prefabricated antennas 406.sub.a-d. The antennas may be embedded in the skin of housing 402 or built on circuit boards contained in housing 402, protrude from housing 402 or be otherwise configured. Example antennas include patch antennas, dipole antennas and etched antennas. Uniformly or nonuniformly spaced arrays of antennas may be employed as well as various combinations of patterns and polarizations including linear and circular, planer or three dimensional. GPE/CPE unit 400 can also include interfaces for additional antennas, ports for communicating and receiving data and other features.

Figure 4B:
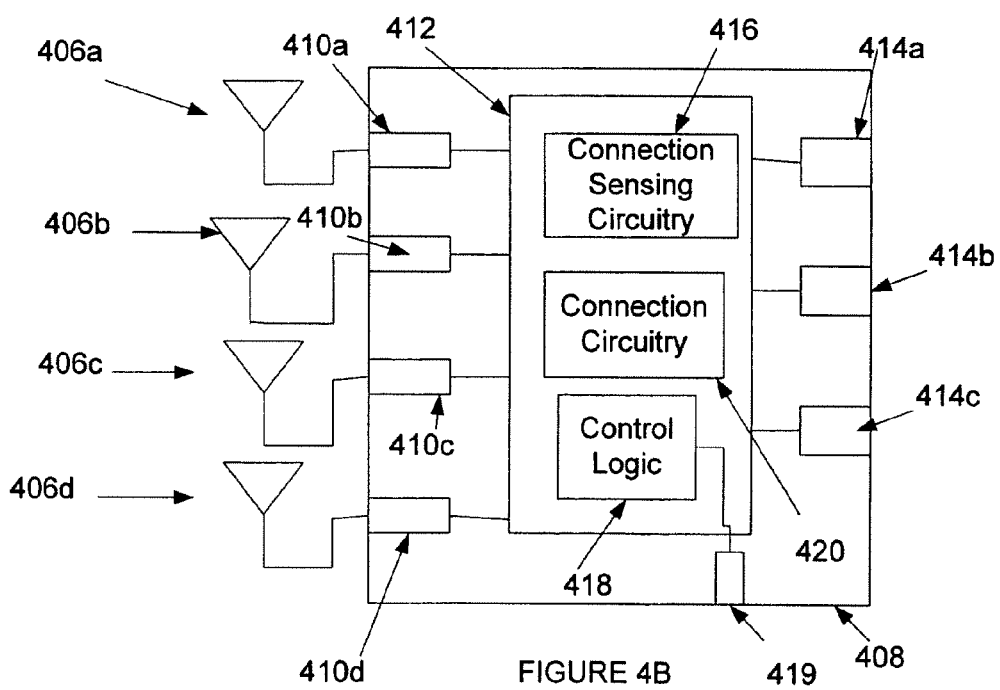

According to one embodiment of the present invention, RADs can be connected to the antennas via a RF backplane. FIG. 4B illustrates one embodiment of connecting antennas 406.sub.a-n to one or more RADs via an RF backplane 408. RF backplane 408 allows a user to plug in additional RAD cards without worrying about details such as impedance matching, control or phasing issues. RF backplane 408 provides "works-in-a-drawer" capability where one or more RAD cards may simply be inserted into GPE/CPE unit 400 and the RF backplane 408 uses RF sensing, RF phasing, make-or-break detection (e.g., DC or low frequency) and RF combining to connected the RAD cards with the existing antenna structure. RF backplane 408 provides connectivity between the RF portion of a RAD, discussed below, and antennas already connected to backplane 408 (i.e., prefab antennas, antennas on other RADs, antennas added to backplane 408 or other antennas).

It should be noted that the antennas 406.sub.a-d may be used for both transmission and reception or may be shared by transmit and receive RF changes. Some antennas may be used for transmission, some for reception and some for both. The antennas can operate according to one or more frequency bands.

RF backplane 408 can include antenna connections 410.sub.a-d connected to antennas 406.sub.a-d, which can include any antenna connection mechanism known in the art. Antenna connections 410 allow signals to travel from the antennas to backplane circuitry 412. RF backplane 408 can also include one or more RF connections 414.sub.a-c to interface with a receiver, transmitter transceiver or other radio circuitry (i.e., RF circuitry). According to one embodiment, the RF circuitry can be implemented in an RF circuitry on a RAD card, as will described below. Thus, RF connections 414.sub.a-c can be RAD connectors 414.sub.a-c. Since the example embodiment of FIG. 4A only includes three expansion slots, RF backplane 408 can include three RAD connectors. However, a greater or smaller number of RAD connectors can be used. Connection between a RAD and RF backplane 308 can be achieved through contacts, easy-plug connectors, spring loaded contacts or other mechanism for connecting circuit components known in the art. According to one embodiment of the present invention, the RAD connectors 414 can be formed of a highly conductive, high strength material. According to another embodiment of the present invention, RAD connectors 414 can be formed of a highly conductive copper alloy. RAD connectors 414 can be gold plated.

According to one embodiment of the present invention, backplane logic and circuitry 412 that can include connection sensing circuitry 416, control logic 418 and connection circuitry 420. Connection sensing circuitry 416 can sense when a RAD unit is connected to a particular RAD connector 414. For example, connection sensing circuitry 416 can detect when a RAD unit is connected to RAD connector 414.sub.a. This can be done, for example, through detecting a change in impedance, voltage or current on connection 414.sub.a. According to another embodiment of the present invention, each RAD, when connected, can emit a low frequency signal or other arbitrarily defined signal. Connection sensing circuitry 416 can include logic to detect the low frequency signal on a connection (e.g., connection 414.sub.a) to determine that a RAD has been connected to that connection. The signal asserted by the RAD to indicate its presence can be configured so that the signal has no or negligible impact on other signals passing between RF backplane 408 and the RAD (e.g., signals received from antennas, control signals or other signals). Connection sensing circuitry 416 can employ any mechanism known in the art for sensing the connection with the transmitter/receiver or transceiver (i.e., the RF unit on the RAD, discussed below) or other connection sensing circuitry known in the art.

Once an active connection is identified (e.g., when it is determined that a RAD is connected via connection 414.sub.a), control logic 418 can configure RF backplane 408 to connect one or more circuits, such as RF combining circuitry 422, coupling circuitry 424, phasing circuitry 426, and impedance matching circuitry 428 to the active connection(s) (e.g., the connections to which a RAD is connected). Essentially, control logic 420 controls how connection circuitry 420 is connected between an active antenna and active RAD connections. Connection circuitry 420 essentially builds a bridge between the active RAD connection 414.sub.a-c and the active antenna connections 410.sub.a-d. In other words a series of circuits for RF combining, coupling, phasing and impedance matching and other signal processing functions can be connected to the active connection 414.sub.a and one or more of the antenna connections 410. Backplane circuitry 412 may also provide power leveling to ensure known or calibrated power levels are delivered to each antenna.

According to one embodiment of the present invention, connection circuitry 420 can connect active RAD connections to active antenna connections according to connections established by control logic 418. Control logic 418 can be implemented as a low-level controller or simple logic. Control logic 418 can change the configuration backplane 408 (i.e., can change how the antenna connections are connected to the RAD connections via the connection circuitry) based on, for example, signals received via control interface 419 from the network fuser, GPE, CPE, a RAD or other device. Control logic 418 can also be implemented as a controller executing software instructions stored on a computer readable memory (RAM, ROM, Flash Memory, EEROM, optical or magnetic medium or other computer readable memory) or according to other control logic architectures known in the art. Thus, the control processing for determining the configuration of backplane 408 can be performed by control logic 418 or can be performed by other logic (e.g., by the network fuser). Control logic 418 and connection circuitry 420 can be implemented as a single controller, as one or more discrete components or according to any circuitry architecture known in the art. It should be noted that just as additional RADs can be connected to the backplane, additional antennas can be added. Backplane circuitry 412 can sense the newly connected antennas and reconfigure the backplane to connect the new antennas to new or existing RADs. Moreover, backplane circuitry 412 can notify other devices (e.g., the network fuser) of the addition of RAD units of antennas.

Backplane circuitry 412 can include, according to various embodiments of the present invention, a series of PIN diodes spaced along an RF microstrip or stripline network and may be implemented using lumped components and/or distributed components, as would be understood by those of ordinary skill in the art. For example, proper connections between a RAD connection 414 and an antenna, say connection 414.sub.a and antenna 406.sub.b, may be achieved through use of pin-diode impedance matching circuitry, with one or more butler matrices, one or more Wilkinson combiners, filters (e.g., cavity resonators or other filters), SAW filters, phase shifters, amplifiers, attenuators, resistors, or other techniques known in the art for establishing a connection between an antenna and RF circuitry (e.g., RF circuitry on the RAD or other RF logic). The various circuits for connecting the antenna to the active RF connector 414 can be implemented as a lumped circuit or a may distributed among multiple chips and circuit components. RF backplane 408 can be configured based on processing by backplane circuitry 412 or based on processing occurring at other components, such as additional logic at the CPE, logic at the GPE, logic at the network fuser or other processing.

The RF backplane architecture of embodiments of the present invention allows an unskilled user to simply plug in the RAD cards (or other card providing RF circuitry). The proper phasing, connectivity, and antenna topology for the specific needs of the individual user, or for the overall performance of the network at large can be determined and backplane circuitry 412 can be configured accordingly. The needs may be controlled differently at a GPE versus a CPE. For example, the GPE may be concerned more about fair resource allocation and network throughput while the CPE may control to ensure maximum energy capture.

According to one embodiment, a network fuser can provide the configuration logic to adjust the backplane circuitry to change the antenna topology and connection. The network fuser can communicate control signals to control logic 418 to change connections of backplane circuitry 412. This can be done in a real-time or near-real-time manner depending on conditions in the communications network such as levels of interference, coverage, bandwidth requirements of different users, queuing availability, queue sizes of one or more users, etc. The configuration may be dynamically changed "on-the-fly" and might differ in the uplink or downlink cases. As an example, in an FDD system the configuration might change on uplink or downlink while in a TDD system the configuration might stay the same due to reciprocity.

Backplane circuitry 412 can be configured to connect antennas to RADs in a variety of configurations including, but not limited to, beam forming, phased array, diversity combining, maximum ratio combining, antenna switching, as well as sophisticated MIMO processing configurations including antenna subset selection, transmit preceding, and eigenbeamforming among other techniques known to those skilled in the art. Through suitable choice of mode, the connected RADs can exploit one or all of the available antennas. The number of antennas, the power of each antenna and other factors provided by the backplane circuitry 412 to a particular RAD unit can be configured by the network fuser. In the case of the GPE this might be a global control while for the CPE this might be a local control. The logic for the choice of a mode of operation can be implemented at the network fuser, described below. The network fuser can communicate with control logic 418 to connect active antenna connections to the active RAD connection via connection circuitry 420.

Figure 5:
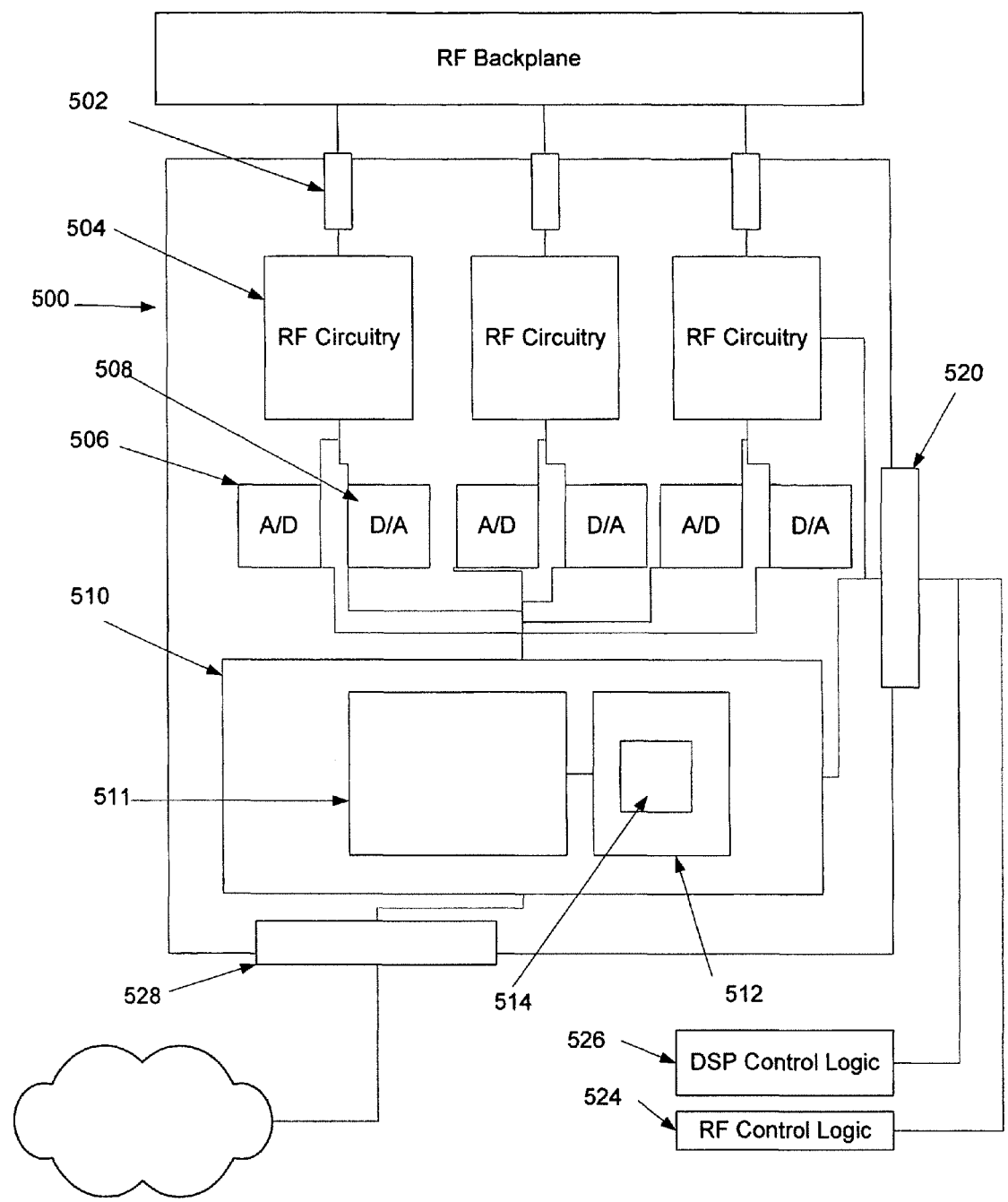
FIG. 5 is a diagrammatic representation of one embodiment of an RF and digital signal processing ("DSP") unit ("RAD unit")

FIG. 5 is a diagrammatic representation of one embodiment of RAD unit device 500. A RAD unit can be a modular unit that includes RF circuitry, analog to digital conversion, digital-to-analog conversion and digital signal processing. RAD unit 500 can include a backplane interface 502 to interface an RF circuitry 504 (e.g., a receiver, a transmitter, and/or a transceiver and associated logic) with an RF backplane (e.g., RF backplane 408 of FIG. 4). RF circuitry 504 can convert received a received signal (e.g., received from an antenna via the RF backplane) to a lower RF, IF or baseband frequency and/or convert lower RF, IF or a baseband frequency to an output signal to be applied to an antenna via, for example, the RF backplane. RF circuitry 504 can include by way of example, but not limitation, frequency synthesizers, mixers, filters, amplifiers, attenuators, gain controls, level setting capabilities and other functionality known in the art. RF circuitry 504 can include digital frequency synthesis, phased locked loop controller or other programmable capabilities. RF circuitry 504 can thus include digital logic, hardwired circuitry and/or any circuitry needed or desired to convert a signal received from DSP unit 510, discussed below, to an output signal for transmission via the antenna and convert an input signal received from the RF backplane (or embedded antenna) into a receive signal.

Each set of RF circuitry, such as RF circuitry 504, can be connected to one or more analog-to-digital (A/D) converters (e.g., A/D converter 506) and one or more digital to analog converters (e.g., D/A converter 508). A/D converter 506 can receive an analog signal generated by RF circuitry 504 (a baseband receive analog signal) and convert it to a receive signal (e.g., a baseband IF or other signal). D/A converter 508 can receive a transmit signal and can convert it to an analog signal. The analog transmit signal can be sent to RF circuitry 504 for conversion to an output signal. The output signal can be passed to the RF backplane for transmission via an antenna. Thus, the RF circuitry can generate an output signal based on the transmit signal generated by the DSP unit.

RAD 500 can include one or more digital signal processing units (e.g., DSP unit 510) that can be connected to one or more sets of RF circuitry via D/A and/or A/D converters. DSP unit 510 can include a processor (e.g., processor 511) that can be a dedicated DSP, a microcontroller, ARM, CPU, programmable logic, such as FPGA, or fixed logic, such as ASIC. Combinations of fixed logic and processing are also possible both on a single chip and in configuration where multiple chips implement the processing on a single board. DSP unit 510 can, according to one embodiment of the present invention, includes a computer readable medium 512 (e.g., RAM, ROM, magnetic storage, Flash memory or other computer readable medium known in the art) connected to a processor 511. Computer readable medium 512 can include computer instructions 514 executable by processor 511 to convert data into a transmit signal and convert a receive signal into data. Thus, the DSP unit can generate a transmit signal based on data received from, for example, a network fuser and can generate data based on the receive signal generated by the RF circuitry. The computer instructions can be executed to perform various algorithms such as space-time processing algorithms and other algorithms. The computer instructions 514 can be further executable to send DSP control signals to other RAD units, process control signal and perform other functionality. DSP unit 510 can take inputs from all sets of RF circuitry or particular processors may be dedicated to a particular RF circuitry.

RAD unit 500 can include a digital interface 520 for exchanging information with one or more additional RAD units, RF control logic 524, DSP control logic 526 via a control network, line or other data transport medium. RAD unit 500 can also include a network interface 528 for communicating data received on or to be transmitted via a wireless communication link (e.g., link 124 of FIG. 1). Digital interface 520 may be wired or wireless. It is implemented using rapid I/O, hyper transport, gigabit Ethernet, Ethernet, SCSI, UWB, firewire, USB, hyper link, or bluetooth. Digital interface 520 may permit a point-to-point connection of one RAD unit to another or from one RAD unit to all other RAD units at the same time as the case with a network of RAD units. Digital interface 520 can provide connection to the various sets of RF circuitry of the RAD and the DSP units of the RAD. RF control logic 524 can be used to control RF circuitry 504 (and other sets of RF circuitry if present). RF control logic 524 can provide RF configuration information to control factors such as the gain, phase, attenuation, oscillator, or RF frequency, the subset of antennas from which to receive signals if a single set of RF circuitry is connected to multiple antennas, the weights of the antenna combining including phased or more sophisticated weighting methods, whether to power on or power off the RF circuitry. An RF control signal from RF control logic 524 may come from an external controller, from another RAD unit, a network fuser or other device.

DSP control logic 526 can provide DSP configuration information to control the parameters of the DSP unit 510, including, for example, the type of space-time processing that should be employed by the DSP. DSP control logic 526 can also adjust physical layer parameters such as the bandwidths of the filters; it might provide synchronization information so the DSP knows when to start processing the signal. DSP control logic 526 may be bidirectional in that DSP unit 510 can send and receive control information to and from the DSP units of other RADs.

Network interface 528 is used to connect the RAD to a network. Network interface 528 may be Ethernet, Gigabit Ethernet, wireless LAN, token ring interface or other interface. Network interface 528 may be used to deliver data to/from a data network. Using a separate network interface 528 and digital interface 520, allows a dedicated interface 520 for connection to other RAD units and external devices for the purpose of facilitating more sophisticated processing. According to other embodiments of the present invention, DSP unit and RF circuitry can be communicated with via network interface 528 rather than a dedicated interface. In this case, the control data transport medium and data network can be the same network.

RAD unit 500 can support space-time processing and, more generally, MIMO communication through the use of multiple RF transceivers at RF circuitry 504. MIMO communication systems generally offer the following benefits relative to single antenna systems: (i) Substantial capacity improvements. It has been shown that MIMO systems can increase the data rate that can be supported on a communication link in proportion to the minimum of the number of transmit and number of receive antennas. This is with the same amount of bandwidth and the same total power. (ii) Substantial quality improvement. MIMO systems also offer the ability to significantly improvement due to an increase in diversity. Essentially, with MIMO communication, there are at least $M.sub.t*M.sub.r$ possible paths between transmitter and receiver, Thus, the probability that the communication channel is in a fade decreases with the product. This quality reduces the number of retransmissions and improves the perceived quality of the link making it look more like a wireline communication system. (iii) Superior performance in non-line-of-sight propagation. MIMO communication systems take advantage of scattering in the channel, therefore they work well when there is not a direct path between the transmitter and the receiver. RAD 500 can employ MIMO processing to obtain all of the benefits of MIMO communication as described above.

In one embodiment, RAD 500 can exploit beam forming to adaptively adjust the beam patterns of receive antennas. Essentially the plurality of antennas are used to create an adaptive antenna that has an adjustable beam pattern. The pattern can be adjusted based on any number of algorithms known to those skilled in the art to maximize received signal-to-noise ratio, signal-to-interference ratio, signal-to-interference-plus-noise ratio, or to minimize interference. The transmit beam may be derived using reciprocity relationships from the optimal receive beam pattern or may be inferred from control information. The patterns may be a function of the number of active users and may in part be determined by user traffic as well as the scheduling algorithms. The patterns may be adjusted dynamically or may be configured once and then fixed. RAD 500 may be informed about traffic and interference information through network interface 528 or through other control lines.

In another embodiment, RAD 500 uses MIMO communication links that exploit more advanced strategies such as spatial multiplexing and transmit diversity to provide additional capacity and reliability in the communication link. With spatial multiplexing, for example, the RAD sends independent data streams from each of its sets of RF circuitry in the transmit direction. In the receive direction, the RAD unit processes the received data to extract the multiple transmitted data streams. With space-time coding, RAD unit 500 transmits space-time code words for the purpose of extracting diversity from the channel. On the receive side, RAD 500 unit processes the received data to determine which space-time code words were transmitted. RAD unit 500 may make use of other MIMO techniques such as linear dispersion codes, space-time beam forming, interference cancellation, and other algorithms known to those in the state-of-the-art.

Figure 6:
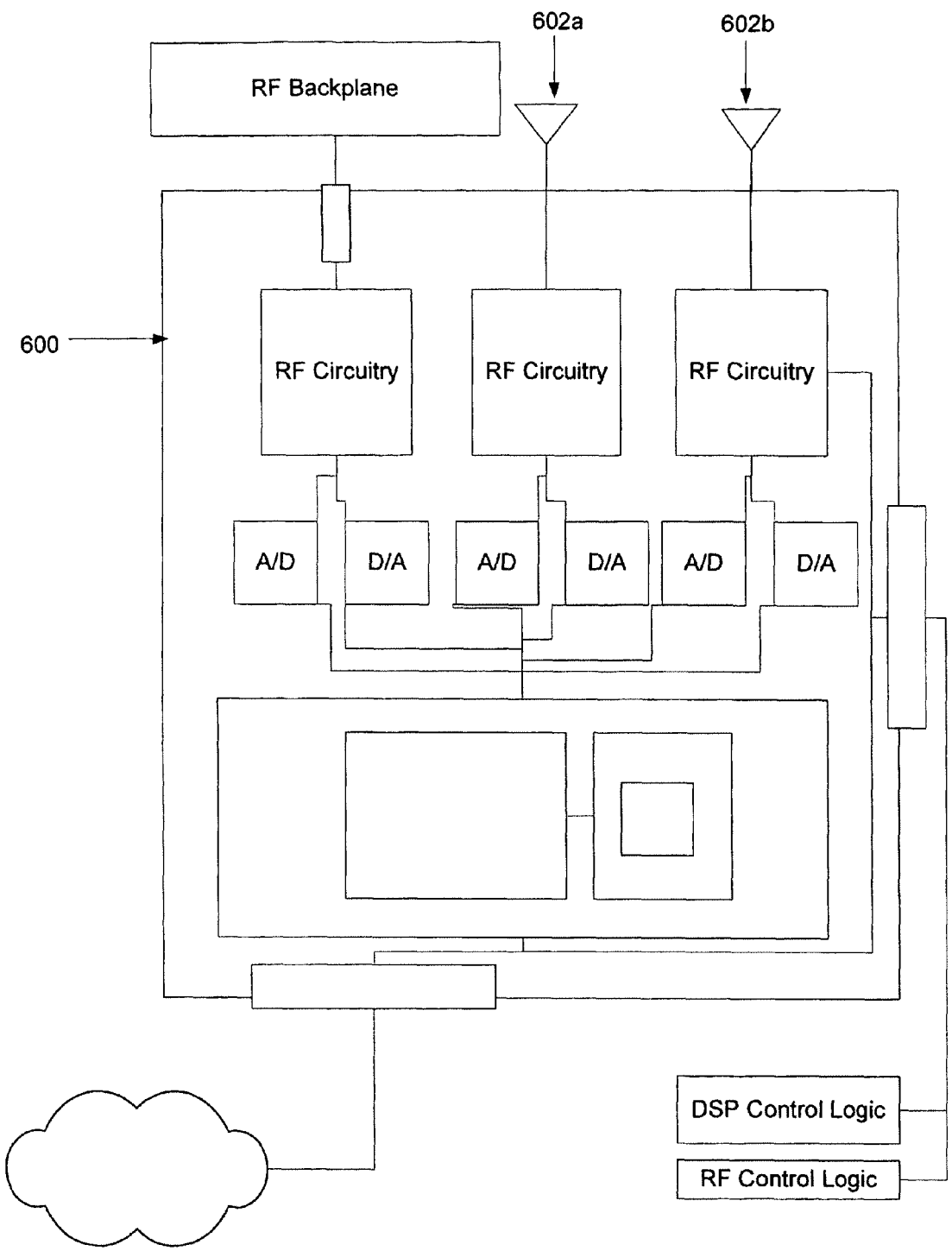
FIG. 6 is a diagrammatic representation of another embodiment of a RAD unit.

It should be noted that RAD Unit 500 has been discussed in terms of using antennas connected via RF backplane 408. However, RAD Unit 500 may include embedded antennas. FIG. 6 illustrates one embodiment of a RAD unit 600 that includes embedded antennas 602.sub.a-b. In this case, RAD Unit 600 may not have a connection for the RF backplane and may not be equipped with the RF or connection sensing capability. According to other embodiments of the present invention, RAD unit 600 can include connections to the RF Backplane. RAD unit 600, according to one embodiment of the present invention, can interface with the RF backplane control logic (e.g., backplane control logic 418 of FIG. 4) to inform the RF backplane antennas connected to the RF backplane are not needed. RAD units with and without embedded antennas can coexist within the same CPE/GPE. The embedded antennas RAD unit 600 can also become part of the antennas considered in the RF backplane described previously and thus may be controlled in the same manner as if they were part of the RF antenna backplane. The antennas, if located in RAD unit 600, can be embedded within the outer skin RAD unit 600 or be built on circuit boards or casings such as patch antennas, or be etched on microstrips coupled to RAD unit 600 or be placed on the perimeter of RAD unit 600. According to one embodiment, integrated dual polarized patch antennas are used. Uniformly or nonuniformly spaced arrays of antennas may be employed as well as various combinations of pattern and polarizations including linear and circular, planar or 3D.

It should be understood that one RAD unit may also have multiple antennas or multiple connections to the RF backplane yet have a single set of RF circuitry to convert to/from the baseband digital signal. In other words, a single set of RF circuitry may receive signals from multiple antennas, but only output a single signal to DSP the unit. In this case the set of RF circuitry might incorporate an RF switch or combiner for the purpose of combining the signals from the plurality of antennas. Additional control logic, which forms an additional input to the set of RF circuitry, might be employed to determine the appropriate selection or combining weights. A set of RF circuitry may also make independent decisions itself using its own control logic. Filtering can be part of the RF circuitry to restrict the bandwidth of the incoming signals. This filtering may be hardwired, may be cavity resonators, or may be embedded RF microstrip filters among other choices.

Figure 7:
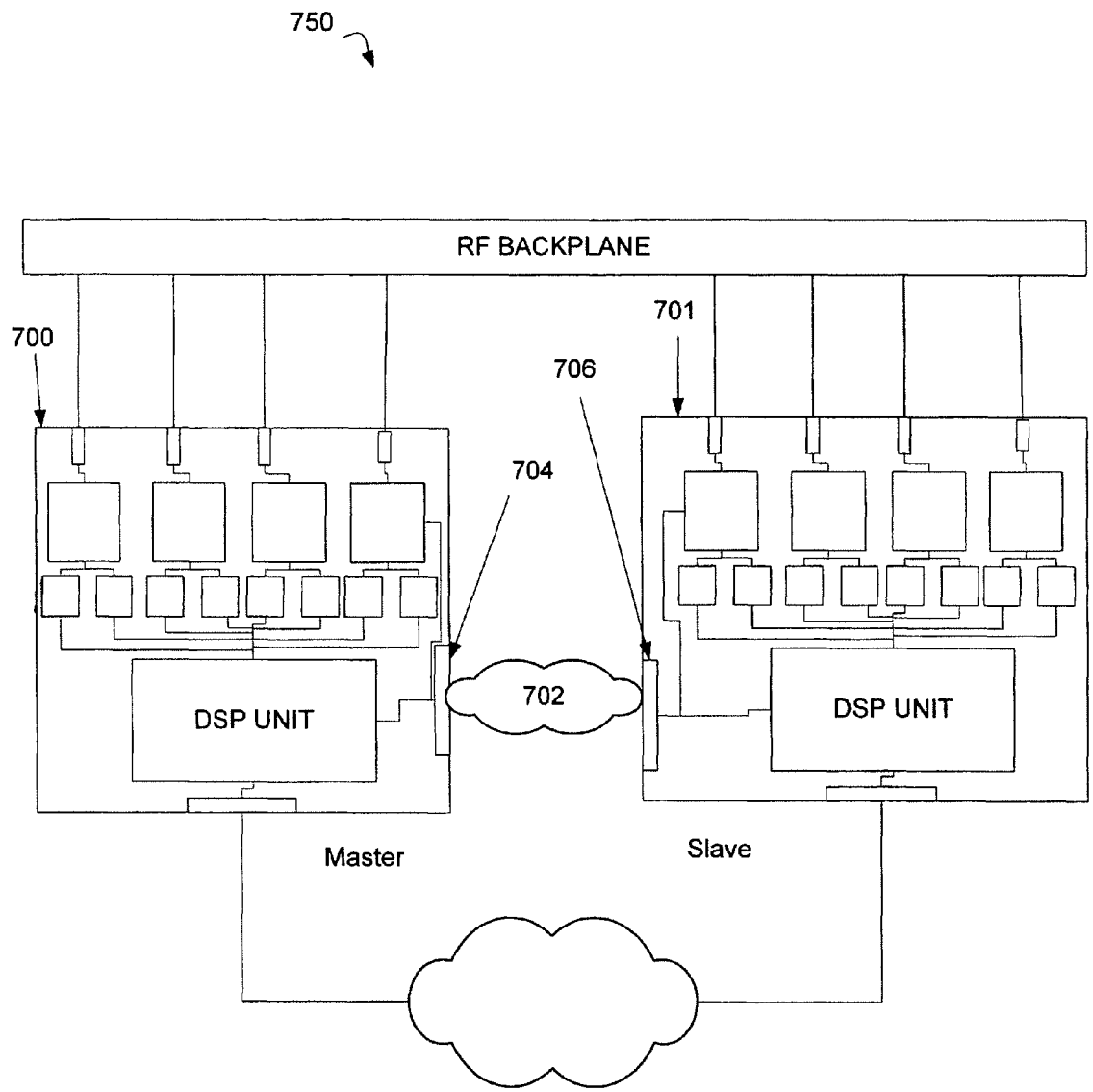
FIG. 7 is a diagrammatic representation of one embodiment of multiple RAD units in a master-slave configuration.

FIG. 7 is a diagrammatic representation of one embodiment of a system 750 in which multiple RAD units can be combined together. In the embodiment of FIG. 7, RAD UNIT 700 can be connected to RAD Unit 701 via a network 702 (e.g., rapid I/O, hyper transport, gigabit Ethernet, Ethernet, SCSI, UWB, firewire, USB, hyper link, or Bluetooth). For system 750 of FIG. 7, each RAD unit 700 and 701 can connect to network 702 via a digital interface 704 and 706, respectively. RAD unit 700 and RAD unit 701 can exchange data to facilitate processing through their high-speed link. They may be connected to a common high-speed bus or may be connected in a serial fashion according to the nature of the high-speed link. Control signals, in the form of RF and DSP control signals can be exchanged between the RAD units to facilitate this combination. The RF control signals allow the sets of RF circuitry of multiple RAD units to be coordinated as if they were part of one larger RAD unit. The DSP control allows the DSP units of multiple RAD units to operate together through the use of parallel processing. Adding more RAD units effectively adds more parallel processing blocks. Because receiver processing for MIMO generally requires access to the data from all the antennas, in one embodiment the high-speed connection 702 can be used for the purpose of providing each RAD unit with the sampled received data from all the other RAD units. Equivalently, all the RAD units can be provided with the same transmit data to facilitate generation of the transmit space-time waveform.

According to one embodiment of the present invention, connected RAD units can be in a master-slave configuration, in which a master RAD unit sends control signals to the slave RAD units for the purpose of configuring and controlling their operation. In this case, the master RAD unit can provide all or a portion of the DSP control logic and RF control logic (e.g., DSP control logic 526 and RF control logic 524 of FIG. 5) for slave RAD units. For example if RAD 700 is the master RAD unit, RAD unit 700 can provide the DSP control logic and RE control logic for RAD unit 701.

According to one embodiment of the present invention, processing of received signals can be distributed among the RAD units. Each RAD unit can downsample and preprocess the RF signals from the antennas to which it is connected (e.g., via the backplane) and share the raw data with adjacent RAD units. The RAD units can then process the data in parallel. In this case, each RAD unit can process a different part of the data in parallel, taking advantage of parallel processing. The master RAD unit can send control signals to each RAD unit to instruct the RADs on which portion of the data each RAD unit should process. In the transmit direction, the master RAD unit takes data from network 604 and splits it among the other RAD units for processing. The master RAD unit configures the RF and DSP processing of the other RAD units based on any number of parameters including feedback from a gateway, interference estimation, system loads, signal to noise ratios or other parameters.

Figure 8:
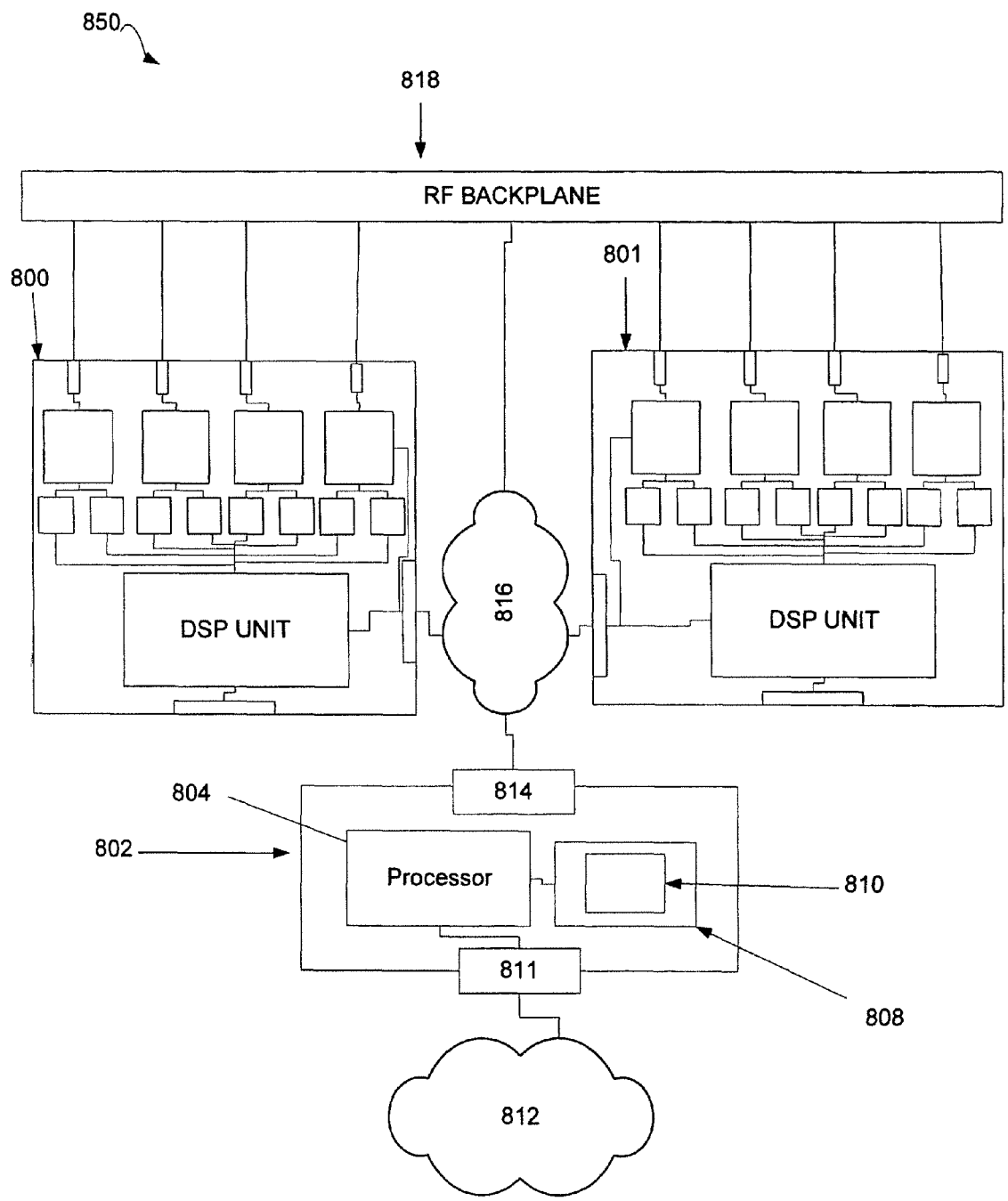
FIG. 8 is a diagrammatic representation of one embodiment of a system in which multiple RAD units are connected to a network fuser.

FIG. 8 is a diagrammatic representation of another embodiment of a system 850 employing multiple RAD units. In the system 850 of FIG. 8, the multiple RAD units (e.g., RAD unit 800 and RAD unit 801) can be controlled by a network fuser 802, which may be part of one of the RAD units or may be separate. System 850 can be implemented, for example, as part of CPE or GPE unit. Network fuser 802 may be implemented in any number of different forms. Network fuser 802, for example, can include a network fuser processor 804 (e.g., DSP, FPGA, ASIC or other processor known in the art) that can execute computer instructions 810 stored on a computer readable medium 808 (e.g., RAM, ROM, Flash, EEPROM or other computer readable medium known in the art). Network fuser 802 can include a network interface 811 to connect to a data network 812 and a digital control interface 814 to connect to a control data transport medium 816. RAD units can be connected to the control network 816 by, for example, a digital interface (e.g., digital interface 520 of FIG. 5). Network fuser 802 can further connect to the control logic of RF backplane 818 via a control data transport medium 816 (e.g., a BUS, network or other data transport medium) or an additional network.

In operation, network fuser 802 can provide RF and DSP configuration information (i.e., can act as RF control logic 524 and DSP control logic 526 of FIG. 5). The RF configuration information can include information such as the embedded or connected antennas to use, gains of the RF receivers and settings of oscillators and other RF parameters. The DSP configuration information can include, for example, which space-time processing algorithms to employ, the appropriate coding and modulation rates and other processing parameters. Additionally, network fuser 802 can signal the control logic of RF backplane 818 to configure the RF backplane to connect particular antennas to particular RAD units via the connection circuitry. It can also control the preprocessing performed by each RAD unit before the exchange of information between RAD units. Network fuser 802 can jointly process all the data from the RAD unit or it might allow the RAD units to process the data in parallel as described before. Generally, network fuser 802 can be equipped with a feedback unit for conveying information to other devices, control logic for adjusting the various RF parameters, and provisioning logic.

It should be noted that a network fusers, such as network fuser 802, can be located both at the gateway and at the customer premises. At the customer premises, data network 812 can be, for example, a user's home computer network, an office Ethernet or other network. At the gateway, data network 812 can be a cellular backhaul network, the Internet or other high-speed network.

Network fuser 802 may be implemented by a standalone dedicated microprocessor or microcontroller which probes or receives instantaneous or averaged or collected information from one or more RAD units or from one or more CPEs or GPEs. Network fuser 802 may be located within the same physical container as a CPE or GPE or RAD unit, or it may be remotely located, for example at a central server location, at a network switch, or in a different physical piece of equipment. For example, in future home media entertainment centers where numerous wireless devices in a home or enterprise may be connected by a central controller, the network fuser 802 may be functionally implemented primarily in the central controller, and through wireless or wireline means the network fuser will be able to communicate with, monitor, aggregate, and determine behaviors of one or more of the radio devices. It should be clear that the network fuser may be distributed among one or more components.

By coordinating the activities of various RAD units at multiple GPE/CPE units, the network fuser can coordinate the activities of GPEs/CPEs. Network fuser 802 can coordinate the activities of CPE/GPEs and perform flow control based on measurements including instantaneous user demand, the forward and or reverse link channel state, access history, or state of the backhaul network. Network fuser 802 may use additional information such as user priority (premium class) or an account balance (number of minutes remaining, money left in the account, bill paid on time, etc). This information might be derived from data network 812, from the GPEs or CPEs, or directly from the RAD units. The information might be derived from statistics collected by the network fuser including means, variances, windowed averages, among others or might be based on instantaneous measures of information such as raw observations.

To make decisions about resource allocation, network fuser 802 can store information as, for example, a logical table, For example, information may be indexed based on the user, the network address alias, MAC address, or flow number. Traffic statistics such as average delay and average throughput can be measured trough TCP. Additional user-specific information can be included in the table such as the grade-of-service, quality-of-service requirements, and relevant channel statistics such as the delay spread, average capacity, path-loss, fading rate, etc. The logical table can be stored at the network fuser 802 or remote from the network fuser 802.

Of particular relevance to the performance of the overall network is the acquisition of statistics based on the channel state. First of all, the channel is estimated using methods known to those skilled in the art such as training sequences or pilot tones at the receiver as a byproduct of demodulation. This information is thus available in the GPE and CPE communicated to the network fuser 802.

The process of channel estimation, known as channel-probing, may be done online (while the radio is actively receiving data) or off-line for the expressed purpose of keeping the channel statistics up to date. For example, a charmer probing scenario is the following. The network fuser 802 would instruct the GPE/CPE (or constituent RAD units) to send a probe. Each GPE/CPE can, in response, measure the channel and report that channel to the gateway. This process would be repeated for all channels. Additionally, it will be of interest to measure the interference of one communications link on another. In this case, probes can be sent simultaneously to two different users. CPE or GPE can measure the interference created by the other simultaneous transmission and this information is reported to the GPE. Note that when the measurements are made by the CPE they can be reported to the GPE through a feedback channel, as is known to those skilled in the art. When the measurements are performed at the GPE then they can be directly conveyed to the network fuser.

Network fuser 802 can process the instantaneous channel data to derive statistics based on the channel. For example, statistics such as the mean, variance, delay spread, power-delay profile, Doppler, spatial covariance, correlation, and space-time correlation, which can all be derived from the channel measurements might be useful.

According to various embodiments of the present invention, network fuser 802 can in charge of user schedule and bandwidth provisioning. In one embodiment, the network fuser can determine the user with the largest queue then ascertain the data rate that can be sent to that user. If the desired rate exceeds the target capacity then the user will be served and an attempt will be made to also service additional users. The idea is that if there is excess capacity it should be possible to service a plurality of users. If the target capacity is not achieved then only the user with the largest queue would be served. This is only an example embodiment and it is clear that other approaches to scheduling such as multi-user diversity, proportional fair scheduling, the exponential rule, etc. can also be employed.

In one embodiment, network fuser 802 determines which users can access the channel at a given time based on the aforementioned data such as instantaneous channel state information, access history, or status of the back haul network. In another embodiment, the network fuser provides control signals that adjust adaptive antennas contained in the RAD units or that are connected to the RAD units via the RF backplane. Network fuser 802 can use network-derived information in additional to the physical layer information to guide the adjustment of the beam patterns. For example, network fuser 802 might change the beam pattern based on information about the activity levels of different users. These updates may occur rapidly on the order of a fraction of a second or may occur less frequently such as a few times a day or whenever the system is upgraded and new RAD units are added.

Network fuser 802 can also be in charge of resource management and allocation. For example, carrier frequencies may be dynamically allocated in a given region. In one embodiment a network fuser can borrow carrier frequencies from other gateways that are currently underutilized. In another embodiment, certain frequencies are owned by other entities and are leased dynamically or statically. In this case the network fuser determines the physical layer resources that are available, arranges to borrow them, then assists in allocating these resources to the different GPE/CPE pairs on the channel. Network fuser 802 can also perform other functionality pertinent to the system operation such as subscriber management, including billing, and may serve as a bridge/router/gateway to the high speed network.

In one embodiment, network fuser 802 can aggregate together RAD units, GPE and/or CPEs to act in harmony as a base transmitter station. Network fuser 802, by configuring RF backplane 818 and/or the RADs can aggregate and configure multiple antennas to work "correctly" or "optimally" depending on the situation within the smaller network of CPE that is being serviced by the GPE (the "last mile" service). In one embodiment, this configuration can be done using a combination of multiple antennas and dynamic antennas. The antennas can be dynamic and connected using MIMO links. Network fuser 802 can dynamically link the antennas together based on any number of factors, including potentially the current interference environment, when a particular user is using their access point, and other factors. Network fuser 802 can look at the high speed (or other basic transmitting) network 810, see the packets coming in, and look at the distribution of packets and configure the RADs.

In one embodiment, network fuser 802 is able to adapt to multiple RAD units (e.g., at one or multiple GPEs) to allow bandwidth provisioning that is auto sensing (e.g., identifying which users consume more data). In this case, the RAD units can work in concert under the control of network fuser 802 to focus bandwidth to those users that need additional bandwidth or need to have particular quality of service rankings or priorities. This bandwidth provisioning can be based on subscriber data, the service provider requirements or some other algorithms. In addition, network fuser 802 can provide security such as 802.1X or other new kinds of security that are being proposed and standardized for future wireless systems so that the security checking. Network fuser 802 can be the source of registering the prime user for security. Network fuser 802, according to one embodiment, can actually send the data to a radio server to authenticate and to secure an individual user. Alternatively, there can be hardware or security programmed into the CPE and/or GPE apparatus itself where each user on the network is authenticated and encrypted and verified as valid.

Thus, in one embodiment the network fuser 802 in concert with MIMO links and RAD units to provide "last mile" wireless transfer of data from existing backhaul data networks, such as high speed date networks. Network fuser 802 can control bandwidth provisioning, security, and network management. In another embodiment, network fuser 802 can aggregate traffic statistics and usage statistics and provide that information to service provider's central monitor. A GPE (or multiple GPEs) can provide a base station unit at every "last mile" delivery point. Thus, any number of relatively small, cheap MIMO antenna units are combined at the GPE and/or CPE, connected to the data delivery network, with the network fuser coordinates their activities.

In an alternative embodiment, additional antennas can be added to the GPEs and CPEs to form a switching fabric or array. Network fuser 802 uses the array as a fabric (i.e., there are not dedicated antennas at the GPE that are dedicated to specific CPE locations) so that regardless of which CPE data is being sent to the array is configurable to use different antennas to send the data to different CPE. As capacity increase is needed (e.g., the number of CPE sites being services increases or data requirements increase at existing CPE sites), additional antennas are added to the array at the GPE. The network fuser tracks and controls the array. For example, at any point in time some of the GPE antennas might be aggregated together to use do a particular data transfer, but as data transfer requirements within the CPE sub-network that the GPE services change, those same antennas may be configured to send data to other CPE sites. Also, as antennas are increased, network fuser 802 can reconfigure and map GPE antennas to the CPE antennas. Network fuser 802 can configure the GPE through configuration of RF backplane 818 and/or the RADs at the GPE.

In one embodiment, the number of antennas at the GPE is approximately equal to the total number of antennas at the CPE sites. In an alternative embodiment, the number of antennas at the GPE can be reduced versus the number at the CPE sites using dynamic configuration and provisioning capabilities of the controlling network fuser 802. The use of MIMO antennas can increase the bandwidth transfer from the backhaul data network. The multiple access feature of the invention with MIMO allows supporting multiple users on a channel. MIMO allows, for 4 antenna elements with the processing behind it, providing simultaneous beams with all 4 antennas carrying 4 users at the same time. This flexible GPE/CPE architecture, providing a controlling network fuser with intelligent provisioning and control capabilities separate from the antenna elements, provides the capability to add new antenna (transmit/receive) elements to a GPE/CPE box automatically. The network fuser will reconfigure when new antennas are added to increase the data transfer capability.

Although discussed above in terms of coordinating the activities of multiple RAD units, it should be noted that a network fuser can coordinate the activities of multiple GPE/CPE units as a whole by providing RF configuration information and DSP configuration information to the GPE/CPE units. This can be done if the GPE/CPE units employ RAD units or use other architectures for digital signal and RF processing.

Thus, embodiments of the present invention can include a system for wireless communication that can include a fuser connected to a first GPE/CPE unit (e.g., a CPE or GPE) via a control data transport medium (e.g., SCSI bus, Ethernet, wireless link, optical link, ATM network or other data transport medium known in the art). The network fuser 802 through, for example, execution of computer instructions, can be operable to provide RF configuration information and DSP configuration information to the first GPE/CPE unit. The DSP configuration information can include an indication of the space-time algorithm that the first GPE/CPE unit should use, coding to be applied by the first GPE/CPE unit, modulation to be applied by the first GPE/CPE unit and other configuration information that affects how the GPE/CPE unit processes data to be transmitted via a wireless communication link or received via the wireless communication link. The RF configuration information can include RF parameters such as gain, phase, attenuation, oscillator, or RF frequency that can be applied in converting RF energy to/from a baseband analog signal. Other RF configuration information can include the subset of antennas from which to receive signals if signal combining is to be performed, the weights of the antenna combining including phased or more sophisticated weighting methods, whether to power on or power off the RF circuitry or other configuration information that can affect an RF circuitry.

According to one embodiment of the present invention, the first GPE/CPE unit can include a plurality of antennas and a plurality of RF circuitries. The GPE/CPE unit can include an RF backplane that includes RF backplane logic that is operable to connect the RF circuitry to the antennas in a variety of configurations. The RF backplane can have an arbitrary number of connections for antennas and RF circuitries so that additional RF circuitries and antennas can be connected to the RF backplane. The RF backplane can be connected to the control data transport medium and can receive control signals from the network fuser. The network fuser can be operable to configure the RF backplane to connect various antennas to RF circuitries according to a configuration determined by the network fuser.

The first GPE/CPE unit can also include one or more adaptive antennas. The network fuser 802 can configure the GPE/CPE unit to adjust the adaptive antennas by, for example, providing RF configuration information to the GPE/CPE unit or adjusting an RF backplane. The network fuser 802 can also provide DSP configuration information (e.g., space-time processing information, modulation information, coding information) and/or RF configuration information to adjust the beam patterns generate by the GPE/CPE unit.

The present invention can also include a second GPE/CPE unit remote from the first GPE/CPE unit. The first GPE/CPE unit can be operable to establish a wireless communication link with the first GPE/CPE unit, such as a MIMO communication link. The network fuser 802 can be operable to configure the first PE to establish the wireless communication by, for example, providing appropriate DSP configuration information (e.g., space-time algorithm, modulation and coding) and RF configuration information. Configuration of the first GPE/CPE unit can be based, for example, on instantaneous channel data (e.g., the mean, variance, delay spread, power-delay profile, Doppler, spatial covariance, correlation, and space-time correlation and other instantaneous channel data) received from the first GPE/CPE unit or the second GPE/CPE unit. In order to gather various pieces of information about a particular channel, the network fuser can instruct the first GPE/CPE unit or second GPE/CPE unit to probe a channel.

The network fuser 802, according to one embodiment of the present invention can provision bandwidth to the communication link established between the first GPE/CPE unit and second GPE/CPE unit. This can be done, for example, by providing the GPE/CPE unit with appropriate DSP and RF configuration information for the desired bandwidth. Additionally, the network fuser 802 can provide access controls based, for example, on authentication before allowing data to be transferred to or communicated from a data network via the wireless link between GPE/CPE units.

Additional GPE/CPE units can be connected to the network fuser via the control data transport medium. In this case, the network fuser 802 can be operable to configure the multiple GPE/CPE units. The network fuser 802 can receive data from a data network and provision the data to the multiple GPE/CPE units for communication to one or more remote GPE/CPE units via a wireless communication link. The network fuser 802 can ensure that the PEs to which it can communicate configuration information work together to provide communications links that do not interfere or have minimal interference.

Embodiments of the present invention can include an RF backplane that includes a plurality of antenna connections, connection circuitry and a plurality of RF connections connected to the antennas connections via the connection circuitry. The RF backplane can include control logic that is operable to connect the RF connection to the antenna connections in a variety of configurations. The control logic can be responsive to control signals received from, for example, a network fuser to change the configuration of the backplane. The RF backplane also include connection sensing circuitry to determine when RF circuitry, such as RF circuitry of a RAD unit, has been connected to the RF connection.

Another embodiment of the present invention can include a device that provides RF and digital signal processing capabilities. The device can be modular and be connected to other similar devices. The device can comprise an RF backplane interface to connect to an RF backplane, such as that described above or a static RF backplane, a DSP unit, an RF circuitry and one or A/D and D/A converters between the DSP unit and the RE circuitry. The DSP Unit can generate a baseband transmit digital signal and receive a baseband receive digital signal. The RF circuitry can receive a baseband transmit analog signal and generate transmit RF energy and, in the opposite direction, receive RF energy and generate a baseband receive analog signal. The A/D and D/A converters can convert between the baseband analog and digital signals in each direction.

The DSP unit can generate the baseband transmit digital signal based on space-time processing, modulation and coding implemented by the DSP unit. The DSP unit can be reconfigured based on DSP configuration information to generate the baseband transmit digital signal using various space-time processing algorithms, modulations and/or encodings. Additionally, the parameters of the RF circuitry can be reconfigured. Thus, the device can support various space-time processing configurations.

The device can include a digital interface to connect to a control data transport medium. The DSP can receive DSP configuration information from control logic via the digital interface. The DSP control logic can be located at, for example, a network fuser, a RAD or other device. The device of one embodiment of the present invention can be operable to function in a master or slave configuration.

According to one embodiment of the present invention, the device can be a RAD unit that is modular in design. The RAD unit of this embodiment can have a form factor such that it can be connected to and removed from a GPE/CPE unit relatively easily. Therefore, the RAD units can be added to or removed from a PE easily to provide additional functionality.

Another embodiment of the present invention can include a system for wireless communication comprising a first RAD unit, a second RAD unit, a plurality of antennas, an RF backplane connecting the plurality of antennas to the first RAD unit and the second RAD unit. The system can also include a network fuser connected to the first RAD unit and the second RAD unit and the RF backplane via, for example, a control data transport medium. The network fuser can be operable to provide DSP configuration information to the first RAD unit and the second RAD unit, provide RF configuration information to the first RAD and the second RAD unit, and provide control signals to the RF backplane to configure the RF backplane to connect the plurality of antennas to the first RAD unit and the second RAD unit.

Each RAD unit can include a device that provides RF and digital signal processing capabilities. The device can be modular and be connected to other similar devices. The device can comprise an RF backplane interface to connect to an RF backplane, a DSP unit and RF circuitry. The DSP unit can be operable to generate a transmit digital signal. The RF circuitry can be operable to generate an output signal based on the transmit signal; and generate the receive signal based on an input signal The DSP unit can generate the transmit signal based on space-time processing, modulation and coding implemented by the DSP unit. The DSP unit can be reconfigured based on DSP configuration information to generate the transmit signal using various space-time processing algorithms, modulations and/or encodings. Additionally, the parameters of the RF circuitry can be reconfigured. Thus, the device can support various space-time processing configurations.

The device can include a digital interface to connect to a control data transport medium. The DSP can receive DSP configuration information from control logic via the digital interface. The DSP control logic can be located at, for example, a network fuser, a RAD unit or other device. The device of one embodiment of the present invention can be operable to function in a master or slave configuration.

According to one embodiment of the present invention, the device can be a RAD unit that is modular in design. The RAD can have a form factor such that it can be connected to and removed from a GPE/CPE unit relatively easily. Therefore, RAD units can be added to or removed from a GPE/CPE unit easily to provide additional functionality.

The RF backplane can include a plurality of antenna connections, connection logic, a plurality of RF connections connected to the plurality of antenna connections via the connection circuitry and control logic operable to configure the backplane to connect the plurality of RF connections via the connection circuitry in a variety of configurations. The control logic can be responsive to control signals from the network fuser to change the configuration of the RF backplane.

The network fuser can provide DSP configuration information that can include the space-time algorithm to be applied by the RAD units, the coding to be applied and the modulation to be applied. The space time algorithm, coding, modulation and other configuration parameters can be different between the two RAD units.

The network fuser can configure the RAD units to establish MIMO communications links according to various configurations. The communications links can be configured based, for example, on instantaneous channel data. To gather channel data, the network fuser can instruct the RAD units to probe one or more communications channels. The network fuser can reconfigure the RAD units in real based, for example, on activity of the data network, the communications link or other information. Additionally, the network fuser can provision bandwidth to the communications established by the RAD units and can provide access control.

According to one embodiment of the present invention, the network fuser can determine that a new RAD unit has been added. This can be done, for example, based on information received from the RF backplane logic or from the new RAD unit. The network fuser via the control data transport medium can determine the functionality of the new RAD unit (e.g., how many antennas the RAD has, the amount of RF circuitry, space-time algorithms supported or other information that can be used in configuration of the RAD unit). This information can be provided by, for example, the DSP unit of the new RAD unit. Based on information received from the new RAD unit, the network fuser can reconfigure the existing RADs and configure the new RAD unit.

Although the present invention has been described in detail herein with reference to the illustrated embodiments, it should be understood that the description is by way of example only and is not to be construed in a limiting sense. It is to be further understood, therefore, that numerous changes in the details of the embodiment of this invention and additional embodiments of this invention will be apparent, and may be made by, persons of ordinary skill in the art having reference to this description. It is contemplated that all such changes and additional embodiments are within scope of the invention as claimed below.

What is claimed is:

1. A system of wireless communication comprising:
   a network fuser connected to a control data transport medium;
   a first gateway/customer premises equipment (GPE/CPE) unit connected to the network fuser via the control data transport medium; and
   wherein the network fuser is operable to:
      receive data from a network;
      generate radio frequency ("RF") configuration information for the first GPE/CPE unit;
      generate digital signal processing ("DSP") configuration information for the first GPE/CPE unit;
      provide the radio frequency ("RF") configuration and the digital signal processing ("DSP") configuration information to the first GPE/CPE unit.

2. The system of claim 1, wherein providing DSP configuration information further comprises indicating a space-time algorithm to be applied by the first GPE/CPE unit.

3. The system of claim 1, wherein providing DSP configuration information further comprises indicating a coding to be applied by the first GPE/CPE unit.

4. The system of claim 1, wherein providing DSP configuration information further comprises indicating a modulation to be applied by the first GPE/CPE unit.

5. The system of claim 1, wherein the GPE/CPE unit further comprises: a plurality of antennas; one or more sets of RF circuitry; and an RF backplane operable to connect the plurality of antennas to the one or more sets of RF circuitry in a variety of configurations.

6. The system of claim 5, wherein the RF backplane is connected to the control data transport medium.

7. The system of claim 5, wherein the network fuser is operable to configure the RF backplane.

8. The system of claim 1, further comprising a second GPE/CPE unit remote from the first GPE/CPE unit, operable to establish a wireless communications link with the first GPE/CPE unit.

9. The system of claim 8, wherein the wireless communications link is a MIMO communications link.

10. The system of claim 9, wherein the network fuser is operable to configure the first GPE/CPE unit to establish the MIMO communications link.

11. The system of claim 9, wherein the network fuser is further operable to instruct the first GPE/CPE unit to probe a channel.

12. The system of claim 1, wherein the network fuser is further operable to provision bandwidth to a communication link established between the first GPE/CPE unit and a second GPE/CPE unit.

13. The system of claim 1, wherein the network fuser is further operable to provide access controls.

14. The system of claim 1, wherein the first GPE/CPE unit further comprises one or more adaptive antennas and wherein the network fuser is further operable to configure the first GPE/CPE unit to adjust the one or more adaptive antennas.

15. The system of claim 14, wherein the network fuser can configure the first GPE/CPE unit to adjust beam patterns.

16. The system of claim 1, further comprising a second GPE/CPE unit connected to the network fuser via the control data transport medium.

17. The system of claim 16, wherein the network fuser is operable to receive data from the network and provision the data to the first and second GPE/CPE units for communication to one or more remote GPE/CPE units via a wireless communication link.

18. A system of wireless communication comprising:
   a network fuser connected to a control data transport medium;
   a first gateway/customer premises equipment (GPE/CPE) unit connected to the network fuser via the control data transport medium; and
   a second GPE/CPE unit remote from the first GPE/CPE unit, operable to establish a wireless communications link with the first GPE/CPE unit;
   wherein the network fuser is operable to: receive data from a network; provide radio frequency ("RF") configuration information to the first GPE/CPE unit; and provide digital signal processing ("DSP") configuration information to the first GPE/CPE unit;
   wherein the network fuser is operable to configure the first GPE/CPE unit to establish the MIMO communications link;
   wherein the network fuser is operable to configure the first GPE/CPE unit based on instantaneous channel data received from the first GPE/CPE unit.

19. A system of wireless communication comprising:
   a network fuser connected to a control data transport medium;

a first gateway/customer premises equipment (GPE/CPE) unit connected to the network fuser via the control data transport medium; and a second GPE/CPE unit remote from the first GPE/CPE unit, operable to establish a wireless communications link with the first GPE/CPE unit;

wherein the network fuser is operable to: receive data from a network; provide radio frequency ("RF") configuration information to the first GPE/CPE unit; and provide digital signal processing ("DSP") configuration information to the first GPE/CPE unit;

wherein the network fuser is operable to configure the first GPE/CPE unit to establish the MIMO communications link;

wherein the network fuser is operable to configure the first GPE/CPE unit based on instantaneous channel data derived by the second GPE/CPE unit.

20. A system for provisioning broad-band fixed wireless access comprising:
a gateway, further comprising:
a plurality of gateway premises equipment ("GPE") units;
a network fuser connected to the plurality of GPE units and is operable to coordinate and schedule the activities of the plurality of the GPE units to act as a base station, wherein the network fuser is operable to connect to a high-speed network and to provision data from the high-speed network to each of the plurality of GPE units;
a plurality of customer premises equipment ("CPE") units remote from the gateway;
wherein each GPE unit is operable to establish a wireless MIMO communications link with at least one corresponding CPE unit to wirelessly transfer data received from the network fuser.

21. The system of claim 20, wherein the gateway further comprises at least one new GPE to be added to the gateway, wherein the network fuser is operable to recognize the additional GPE and re-provision bandwidth based on the addition of the new GPE.

22. The system of claim 20, wherein the network fuser is located within one of the GPE units.

23. The system of claim 20, wherein the high-speed data network is a backhaul network.

24. The system of claim 23, wherein the network fuser is further operable to instruct a CPE unit from the plurality of CPE units to probe a channel.

25. The system of claim 24, wherein the CPE unit from the plurality of CPE units is operable to: probe the channel; return channel measurements to the network fuser.

26. The system of claim 20, wherein each of the plurality of GPE units is operable to probe a channel.

27. The system of claim 26, wherein each of the plurality of GPE units is operable to probe the channel according to training sequences.

28. The system of claim 26, wherein each of the plurality of GPE units is operable to probe the channel using pilot tones.

29. The system of claim 26, wherein each of the plurality of GPE units is operable to probe the channel off-line.

30. The system of claim 26, wherein each of the plurality of GPE units is operable to probe the channel on-line.

31. The system of claim 26, wherein each CPE unit is operable to probe a channel according to training sequences.

32. The system of claim 26, wherein each CPE unit is operable to probe using pilot tones.

33. The system of claim 26, wherein each CPE unit is operable to probe the channel off-line.

34. The system of claim 26, wherein each CPE unit is operable to probe the channel online.

35. The system of claim 20, wherein each CPE unit is operable to probe a channel.

36. The system of claim 20, wherein the network fuser is further operable to instruct a GPE unit from the plurality of GPE units to probe a channel.

37. The system of claim 36, wherein the GPE unit from the plurality of GPE units is operable to: probe the channel; return channel measurements to the network fuser.

38. The system of claim 20, wherein the network fuser is operable to instruct the plurality of GPE units and CPE units to perform channel probes.

39. The system of claim 20, wherein each of the plurality of GPE units and each of the plurality of CPE units comprises one or more RAD units.

40. The system of claim 20, wherein the network fuser is further operable to adjust adaptive antennas in each of the plurality of GPE units.

41. The system of claim 40, wherein the network fuser is operable to allocate physical layer resources to the plurality of GPE units.

42. The system of claim 20, wherein the network fuser is operable to: analyze packets received over the high-speed network; configure the plurality of GPE units to wirelessly communicate data from the packets to the plurality of CPE units.

43. The system of claim 20, wherein the network fuser is operable to provision bandwidth based on usage.

44. The system of claim 20, wherein the network fuser is operable to provision bandwidth based on quality of service.

45. The system of claim 20, wherein the network fuser is operable to provision band width based on service provider requirements.

46. The system of claim 20, wherein each of the plurality of CPE units and each of the plurality of GPE units have the same architecture.

47. The system of claim 20, wherein the wireless MIMO communications link employs TDMA, CDMA, FDMA, OFDMA, or SDMA as an access technique.

48. A system for provisioning broad-band fixed wireless access comprising:
a gateway, further comprising:
a plurality of gateway premises equipment ("GPE") units;
a network fuser connected to the plurality of GPE units to coordinate the activities of the plurality of the GPE units to act as a base station, wherein the network fuser is operable to connect to a high-speed network and to provision data from the high-speed network to each of the plurality of GPE units; and
a plurality of customer premises equipment ("CPE") units remote from the gateway;
wherein each GPE unit is operable to establish a wireless MIMO communications link with at least one corresponding CPE unit to wirelessly transfer data received from the network fuser;
wherein the network fuser is operable to provision bandwidth to a particular GPE unit based on a forward link state or a reverse link state of the wireless communication link between the particular GPE unit and the corresponding CPE unit.

49. A system for provisioning broad-band fixed wireless access comprising:
a gateway, further comprising:
a plurality of gateway premises equipment ("GPE") units;

a network fuser connected to the plurality of GPE units to coordinate the activities of the plurality of the GPE units to act as a base station, wherein the network fuser is operable to connect to a high-speed network and to provision data from the high-speed network to each of the plurality of GPE units;

a plurality of customer premises equipment ("CPE") units remote from the gateway;

wherein each GPE unit is operable to establish a wireless MIMO communications link with at least one corresponding CPE unit to wirelessly transfer data received from the network fuser;

wherein the network fuser is operable to provision bandwidth to a particular GPE unit based on user information for a user associated with the corresponding CPE for the particular GPE.

50. The system of claim 49, wherein the user information comprises an access history, a user priority, an account balance grade-of-service, or quality-of-service requirements.

51. The system of claim 50, wherein the network fuser is operable to store the user information indexed by a user name, a network address, a MAC address or a flow number.

52. A system for provisioning broad-band fixed wireless access comprising:
a gateway, further comprising:
a plurality of gateway premises equipment ("GPE") units;
a network fuser connected to the plurality of GPE units to coordinate the activities of the plurality of the GPE units to act as a base station, wherein the network fuser is operable to connect to a high-speed network and to provision data from the high-speed network to each of the plurality of GPE units; and
a plurality of customer premises equipment ("CPE") units remote from the gateway;
wherein each GPE unit is operable to establish a wireless MIMO communications link with at least one corresponding CPE unit to wirelessly transfer data received from the network fuser;
wherein the network fuser is further operable to provision bandwidth to the plurality of GPE units based on a state of a backhaul network.

53. A system for provisioning broad-band fixed wireless access comprising:
a gateway, further comprising:
a plurality of gateway premises equipment ("GPE") units;
a network fuser connected to the plurality of GPE units to coordinate the activities of the plurality of the GPE units to act as a base station, wherein the network fuser is operable to connect to a high-speed network and to provision data from the high-speed network to each of the plurality of GPE units; and
a plurality of customer premises equipment ("CPE") units remote from the gateway;
wherein each GPE unit is operable to establish a wireless MIMO communications link with at least one corresponding CPE unit to wirelessly transfer data received from the network fuser;
wherein the network fuser is further operable to provision bandwidth based on channel statistics.

54. The system of claim 53, wherein the channel statistics comprise a delay spread, average capacity, path loss or fading rate.

55. A system for provisioning broad-band fixed wireless access comprising:
a gateway, further comprising:
a plurality of gateway premises equipment ("GPE") units;
a network fuser connected to the plurality of GPE units to coordinate the activities of the plurality of the GPE units to act as a base station, wherein the network fuser is operable to connect to a high-speed network and to provision data from the high-speed network to each of the plurality of GPE units; and
a plurality of customer premises equipment ("CPE") units remote from the gateway;
wherein each GPE unit is operable to establish a wireless MIMO communications link with at least one corresponding CPE unit to wirelessly transfer data received from the network fuser;
wherein the network fuser is operable to instruct the plurality of GPE units and CPE units to perform channel probes;
wherein the network fuser instructs plurality of GPE units and CPE units to perform channel probes to determine interference caused by simultaneous transmissions.

56. A system for provisioning broad-band fixed wireless access comprising:
a gateway, further comprising:
a plurality of gateway premises equipment ("GPE") units;
a network fuser connected to the plurality of GPE units to coordinate the activities of the plurality of the GPE units to act as a base station, wherein the network fuser is operable to connect to a high-speed network and to provision data from the high-speed network to each of the plurality of GPE units; and
a plurality of customer premises equipment ("CPE") units remote from the gateway;
wherein each GPE unit is operable to establish a wireless MIMO communications link with at least one corresponding CPE unit to wirelessly transfer data received from the network fuser;
wherein the network fuser is operable to instruct the plurality of GPE units and CPE units to perform channel probes;
wherein the network fuser is further operable to derive instantaneous channel statistics based on the channel probes.

57. The system of claim 56, wherein the instantaneous channel statistics comprise a mean, a variance, a delay spread, a power-delay profile, Doppler, a special covariance, a correlation, or a space-time correlation.

58. A system for provisioning broad-band fixed wireless access comprising:
a gateway, further comprising:
a plurality of gateway premises equipment ("GPE") units;
a network fuser connected to the plurality of GPE units to coordinate the activities of the plurality of the GPE units to act as a base station, wherein the network fuser is operable to connect to a high-speed network and to provision data from the high-speed network to each of the plurality of GPE units; and
a plurality of customer premises equipment ("CPE") units remote from the gateway;
wherein each GPE unit is operable to establish a wireless MIMO communications link with at least one corresponding CPE unit to wirelessly transfer data received from the network fuser;
wherein the network fuser is operable to: determine a CPE unit from the plurality of CPE units that has a largest queue of data to be sent to the CPE unit; determine a maximum data rate that can be used to send data to the CPE with the largest queue; and if a total capacity exceeds the maximum data rate, provisioning bandwidth to send data to the CPE unit with the largest queue and using excess capacity to service other CPE units.

59. The system of claim 58, wherein if the total capacity does not exceed the maximum data rate, provisioning bandwidth to only send data to the CPE with the largest queue.

60. A system for provisioning broad-band fixed wireless access comprising:
a gateway, further comprising:
a plurality of gateway premises equipment ("GPE") units;
a network fuser connected to the plurality of GPE units to coordinate the activities of the plurality of the GPE units to act as a base station, wherein the network fuser is operable to connect to a high-speed network and to provision data from the high-speed network to each of the plurality of GPE units; and
a plurality of customer premises equipment ("CPE") units remote from the gateway;
wherein each GPE unit is operable to establish a wireless MIMO communications link with at least one corresponding CPE unit to wirelessly transfer data received from the network fuser;
wherein the network fuser is further operable to adjust adaptive antennas in each of the plurality of GPE units;
wherein the network fuser is operable to adjust the adaptive antennas based on user information comprising an access history, a user priority, an account balance grade-of-service, or quality-of-service requirements.

61. A system for provisioning broad-band fixed wireless access comprising:
a gateway, further comprising:
a plurality of gateway premises equipment ("GPE") units;
a network fuser connected to the plurality of GPE units to coordinate the activities of the plurality of the GPE units to act as a base station, wherein the network fuser is operable to connect to a high-speed network and to provision data from the high-speed network to each of the plurality of GPE units; and
a plurality of customer premises equipment ("CPE") units remote from the gateway;
wherein each GPE unit is operable to establish a wireless MIMO communications link with at least one corresponding CPE unit to wirelessly transfer data received from the network fuser;
wherein the network fuser is further operable to adjust adaptive antennas in each of the plurality of GPE units;
wherein the network fuser is further operable to adjust the adaptive antennas based on channel statistics comprising a delay spread, average capacity, path loss, fading rate, a mean, a variance, a power-delay profile, Doppler, a special covariance, a correlation, or a space-time correlation.

62. A network fuser comprising:
a first interface to connect to a high-speed network;
a second interface to connect to a control data transport medium for connecting to one or more gateway/customer premises (GPE/CPE) units;
a processor;
a computer readable medium accessible by the processor, containing a set of computer instructions,
wherein the network fuser is operable to: coordinate and schedule the activities of the plurality of the GPE/CPE units to establish wireless MIMO communications links; and provision bandwidth to the plurality of GPE/CPE units.

63. The network fuser of claim 62, wherein the network fuser is operable to recognize the addition of a new GPE/CPE unit connected to the network fuser and provision bandwidth based on the addition of the new GPE/CPE unit.

64. The network fuser of claim 62, wherein the network fuser is operable to provision bandwidth to a GPE/CPE unit based on a forward link state or a reverse link state of the wireless communication link between the GPE/CPE unit and another GPE/CPE unit.

65. The network fuser of claim 62, wherein the network fuser is operable to provision bandwidth to a GPE/CPE unit based on user information.

66. The network fuser of claim 65, wherein the user information comprises an access history, a user priority, an account balance grade-of-service, or quality-of-service requirements.

67. The network fuser of claim 66, wherein the network fuser is operable to store the user information indexed by a user name, a network address, a MAC address or a flow number.

68. The network fuser of claim 62, wherein the network fuser is further operable to provision bandwidth to a GPE/CPE unit based on a state of a backhaul network.

69. The network fuser of claim 62, wherein the network fuser is further operable to provision bandwidth based on channel statistics.

70. The network fuser of claim 69, wherein the channel statistics comprise a delay spread, average capacity, path loss and fading rate.

71. The network fuser of claim 62, wherein the network fuser is operable to instruct a GPE/CPE unit to probe a channel.

72. The network fuser of claim 71, wherein the GPE/CPE unit probes the channel according to training sequences.

73. The network fuser of 71, wherein the GPE/CPE unit can probe the channel using pilot tones.

74. The network fuser of claim 71, wherein the network fuser is further operable to instruct the GPE/CPE unit to probe the channel on-line.

75. The network fuser of claim 71, wherein the network fuser is further operable to instruct the GPE/CPE unit to probe the channel off-line.

76. The network fuser of claim 71, wherein the network fuser is operable to instruct a plurality of GPE/CPE units to perform channel probes to determine interference caused by simultaneous transmissions.

77. The network fuser of claim 62, wherein the network fuser is further operable to derive instantaneous channel statistics based on channel probes by GPE/CPE units.

78. The network fuser of claim 77, wherein the instantaneous channel statistics comprise a mean, a variance, a delay spread, a power-delay profile, Doppler, a special covariance, a correlation, or a space-time correlation.

79. The network fuser of claim 62, wherein the network fuser is operable to: determine a GPE/CPE unit with a largest queue of data; determine a maximum data rate that can be used to send data to the GPE/CPE with the largest queue; and if a total capacity exceeds the maximum data rate, provisioning bandwidth to send data to the GPE/CPE unit with the largest queue and using excess capacity to service other GPE/CPE units.

80. The network fuser of claim 79, wherein if the total capacity does not exceed the maximum data rate, the network fuser is operable to provision bandwidth to only send data to the GPE/CPE unit with the largest queue.

81. The network fuser of claim 62, wherein the network fuser is further operable to configure one or more GPE/CPE units to adjust a plurality of adaptive antennas.

82. The network fuser of claim 81, wherein the network fuser is operable to adjust the adaptive antennas based on user information comprising an access history, a user priority, an account balance, grade-of-service, or quality-of-service requirements.

83. The network fuser of claim 81, wherein the network fuser is further operable to adjust adaptive antennas based on channel statistics comprising a delay spread, average capacity, path loss, fading rate, a mean, a variance, a power-delay profile, Doppler, a special covariance, a correlation, or a space-time correlation.

84. The network fuser of claim 62, wherein the network fuser is operable to allocate physical layer resources to a plurality of GPE/CPE units.

85. The network fuser of claim 62, wherein the network fuser is operable to: analyze packets received over the high-speed network; and configure the plurality of GPE units to wireless communicate data from the packets to the plurality of CPE units.

86. The network fuser of claim 62, wherein the network fuser is operable to provision bandwidth based on usage.

87. The network fuser of claim 62, wherein the network fuser is operable to provision bandwidth based on quality of service.

88. The network fuser of claim 62, wherein the network fuser is operable to provision bandwidth based on service provider requirements.

89. A method of wireless communication comprising:
receiving data from a network at a control device;
providing radio frequency ("RF") configuration information from the control device to a first gateway/customer premises equipment (GPE/CPE) unit via a control data transport link between the control device and the first GPE/CPE unit;
providing digital signal processing ("DSP") configuration information from the control device to the first GPE/CPE unit via the control data transport link; and
coordinating the activity of the first gateway/customer premises equipment (GPE/CPE) unit and a second GPE/CPE to establish wireless communications links.

90. The method of claim 89, wherein providing DSP configuration information further comprises indicating a space-time algorithm to be applied by the first GPE/CPE unit.

91. The method of claim 89, wherein providing DSP configuration information further comprises indicating a coding to be applied by the first GPE/CPE unit.

92. The method of claim 89, wherein providing DSP configuration information further comprises indicating a modulation to be applied by the first GPE/CPE unit.

93. The method of claim 89, further comprising configuring an RF backplane of the first GPE/CPE unit.

94. The method of claim 89, further comprising configuring the first GPE/CPE unit to establish a MIMO communications link with a the second GPE/CPE unit.

95. The method of claim 89, further comprising instructing the first GPE/CPE unit to probe a channel.

96. The method of claim 89, further comprising provisioning bandwidth to a communication link established between the first GPE/CPE unit and the second GPE/CPE unit.

97. The method of claim 89, further comprising providing access controls.

98. The method of claim 89, wherein the first GPE/CPE unit further comprises one or more adaptive antennas, and wherein the method further comprises configuring the first GPE/CPE unit to adjust the one or more adaptive antennas.

99. The method of claim 98, wherein said configuring the first GPE/CPE unit to adjust the one or more adaptive antennas comprises configuring the first GPE/CPE unit to adjust one or more beam patterns.

100. The method of claim 89, further comprising provisioning data to a second GPE/CPE unit connected to the control device via the control data transport medium.

101. A method of wireless communication comprising:
receiving data from a network at a control device;
providing radio frequency ("RF") configuration information from the control device to a first gateway/customer premises equipment (GPE/CPE) unit via a control data transport link between the control device and the first GPE/CPE unit;
providing digital signal processing ("DSP") configuration information from the control device to the first GPE/CPE unit via the control data transport link; and
configuring the first GPE/CPE unit based on instantaneous channel data received from the first GPE/CPE unit.

102. A method of wireless communication comprising:
receiving data from a network at a control device;
providing radio frequency ("RF") configuration information from the control device to a first gateway/customer premises equipment (GPE/CPE) unit via a control data transport link between the control device and the first GPE/CPE unit;
providing digital signal processing ("DSP") configuration information from the control device to the first GPE/CPE unit via the control data transport link; and
configuring the first GPE/CPE unit based on instantaneous channel data derived by the second GPE/CPE unit.

103. A non-transitory computer-readable medium containing instructions that, upon execution by a processor, result in the execution of operations comprising:
receiving data from a network;
providing radio frequency ("RF") configuration information to a first gateway/customer premises equipment (GPE/CPE) unit via a control data transport link to the first GPE/CPE unit;
providing digital signal processing ("DSP") configuration information to the first GPE/CPE unit via the control data transport link; and
coordinating the activity of the first gateway/customer premises equipment (GPE/CPE) unit and a second GPE/CPE to establish wireless communications links.

104. The medium of claim 103, wherein providing DSP configuration information further comprises indicating a space-time algorithm to be applied by the first GPE/CPE unit.

105. The medium of claim 103, wherein providing DSP configuration information further comprises indicating a coding to be applied by the first GPE/CPE unit.

106. The medium of claim 103, wherein providing DSP configuration information further comprises indicating a modulation to be applied by the first GPE/CPE unit.

107. The medium of claim 103, said operations further comprising configuring an RF backplane of the first GPE/CPE unit.

108. The medium of claim 103, said operations further comprising configuring the first GPE/CPE unit to establish a MIMO communications link with the second GPE/CPE unit.

109. The medium of claim 108, said operations further comprising configuring the first GPE/CPE unit based on instantaneous channel data received from the first GPE/CPE unit.

110. The medium of claim 108, said operations further comprising configuring the first GPE/CPE unit based on instantaneous channel data derived by the second GPE/CPE unit.

111. The medium of claim 103, said operations further comprising instructing the first GPE/CPE unit to probe a channel.

112. The medium of claim 103, said operations further comprising provisioning bandwidth to a communication link established between the first GPE/CPE unit and the second GPE/CPE unit.

113. The medium of claim 103, said operations further comprising providing access controls.

114. The medium of claim 103, wherein the first GPE/CPE unit further comprises one or more adaptive antennas, and wherein said operations further comprise configuring the first GPE/CPE unit to adjust the one or more adaptive antennas.

115. The medium of claim 114, wherein said configuring the first GPE/CPE unit to adjust the one or more adaptive antennas comprises configuring the first GPE/CPE unit to adjust one or more beam patterns.

116. The medium of claim 103, said operations further comprising provisioning data to a second GPE/CPE unit via the control data transport medium.

\* \* \* \* \*

UNITED STATES PATENT AND TRADEMARK OFFICE
CERTIFICATE OF CORRECTION

PATENT NO. : 8,200,212 B2  
APPLICATION NO. : 11/932123  
DATED : June 12, 2012  
INVENTOR(S) : Rappaport et al.

Page 1 of 1

It is certified that error appears in the above-identified patent and that said Letters Patent is hereby corrected as shown below:

In the Specifications:

In Column 1, Line 51, delete "Page(s);" and insert -- Page(s): --, therefor.

In Column 4, Line 63, delete "RE" and insert -- RF --, therefor.

In Column 6, Line 38, delete "RE" and insert -- RF --, therefor.

In Column 19, Line 35, delete "trough" and insert -- through --, therefor.

In Column 19, Line 52, delete "charmer" and insert -- channel --, therefor.

In Column 23, Line 54, delete "RE" and insert -- RF --, therefor.

In Column 24, Line 40, delete "signal" and insert -- signal. --, therefor.

In the Claims:

In Column 33, Line 58, in Claim 94, delete "a the" and insert -- the --, therefor.

Signed and Sealed this  
Sixteenth Day of October, 2012

David J. Kappos  
*Director of the United States Patent and Trademark Office*